(12) United States Patent
Sakhnini et al.

(10) Patent No.: US 11,943,031 B2
(45) Date of Patent: Mar. 26, 2024

(54) DYNAMIC BEAM SWITCHING DELAY CAPABILITY

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/739,821

(22) Filed: May 9, 2022

(65) Prior Publication Data

US 2023/0361841 A1    Nov. 9, 2023

(51) Int. Cl.
*H04B 7/06* (2006.01)
*H04W 48/16* (2009.01)
*H04W 72/044* (2023.01)
*H04W 72/51* (2023.01)

(52) U.S. Cl.
CPC .......... *H04B 7/0639* (2013.01); *H04W 48/16* (2013.01); *H04W 72/046* (2013.01); *H04W 72/51* (2023.01)

(58) Field of Classification Search
CPC .... H04B 7/0639; H04W 72/51; H04W 48/16; H04W 72/046
See application file for complete search history.

(56) References Cited

U.S. PATENT DOCUMENTS

| | | | | |
|---|---|---|---|---|
| 2021/0083745 A1* | 3/2021 | Nilsson | ................. | H04B 7/0619 |
| 2021/0112540 A1* | 4/2021 | Zewail | .................. | H04W 72/23 |
| 2021/0306866 A1* | 9/2021 | Zewail | .................. | H04L 5/0023 |
| 2021/0321383 A1 | 10/2021 | Nam et al. | | |
| 2022/0158715 A1* | 5/2022 | Bishwarup | ............. | H04W 76/19 |
| 2022/0210844 A1* | 6/2022 | MolavianJazi | ......... | H04L 5/005 |
| 2022/0361006 A1* | 11/2022 | Xu | ......... | H04L 5/0023 |
| 2022/0399930 A1* | 12/2022 | Saggar | .................. | H04W 16/28 |
| 2023/0052430 A1* | 2/2023 | Kang | ................... | H04B 7/0626 |
| 2023/0082655 A1* | 3/2023 | Venugopal | ............ | H04L 5/0092 |

FOREIGN PATENT DOCUMENTS

WO    WO-2021177782 A1    9/2021

OTHER PUBLICATIONS

International Search Report and Written Opinion—PCT/US2023/066250—ISA/EPO—Jul. 27, 2023 (2202303WO)

* cited by examiner

*Primary Examiner* — Jaison Joseph
(74) *Attorney, Agent, or Firm* — Holland & Hart LLP

(57) ABSTRACT

Methods, systems, and devices for wireless communication are described. A user equipment (UE) may update a capability to a network entity periodically when the complexity, power, or memory needs of the UE change. The UE may additionally update the capability upon being triggered by a network entity, during a time scheduled by the network entity, upon the expiration of a timer, etc. The capabilities may be or include explicit values for beam switching delay, or an index selecting delay values from a table previously configured to the UE, for example. Additionally, The UE and network entity may support communications according to capability values associated with a time delay between a transmitted reference signal with repetition and the UE being ready for a downlink transmission using a beam selected based on the reference signal. This capability may indicate to the network entity to avoid scheduling downlink messages during the delay.

30 Claims, 18 Drawing Sheets

DYNAMIC BEAM SWITCHING DELAY CAPABILITY

FIELD OF TECHNOLOGY

The following relates to wireless communication, including dynamic beam switching delay capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some systems, a UE may support beam selection and refinement as part of a beam switch procedure during wireless communication between the UE and a network entity. The beam switch procedure may involve events including a transmit beam selection procedure (e.g., a P-1 procedure), a transmit beam refinement procedure (e.g., a P-2 procedure), and a receive beam refinement procedure (e.g., a P-3 procedure), for example.

SUMMARY

The described techniques relate to improved methods, systems, devices, and apparatuses that support dynamic beam switching delay capability. For example, the described techniques provide for techniques for a beam switching capability for a user equipment (UE). For example, a UE may dynamically change a beam switching delay capability based on complexity, or power and memory needs at the UE. Additionally, or alternatively, the UE may receive a trigger from a network entity and may update the capability based on receiving the trigger. In some examples, the UE may update the capability during a time scheduled by the network entity. In some examples, the UE may update the capability upon the expiration of a timer. According to aspects depicted herein, the UE may transmit, to a network entity and via one or more uplink messages, multiple UE capability values pertaining to UE support of different beam switching delay times for selection of a reception beam at the UE. In some examples, the different beam switching delay times each associated with a same type of beam switching event. Additionally, or alternatively, the UE may transmit, to a network entity and via an uplink message, a UE capability value pertaining to UE support of one or more beam switching delay times for selection of a reception beam at the UE for receiving downlink transmission after receiving a channel state information signal (CSI-RS) with repetition. The UE may then switch beams in accordance with the transmitted uplink message.

A method for wireless communication at a user equipment (UE) is described. The method may include transmitting, to a network entity and via one or more uplink messages, a set of multiple UE capability values pertaining to UE support of different beam switching delay times for selection of a reception beam at the UE, the different beam switching delay times each associated with a same type of beam switching event, receiving, from the network entity, a first downlink message that triggers the beam switching event, and switching to the reception beam based on receiving the first downlink message.

An apparatus for wireless communication at a UE is described. The apparatus may include a processor, memory coupled with the processor, and instructions stored in the memory. The instructions may be executable by the processor to cause the apparatus to transmit, to a network entity and via one or more uplink messages, a set of multiple UE capability values pertaining to UE support of different beam switching delay times for selection of a reception beam at the UE, the different beam switching delay times each associated with a same type of beam switching event, receive, from the network entity, a first downlink message that triggers the beam switching event, and switch to the reception beam based on receiving the first downlink message.

Another apparatus for wireless communication at a UE is described. The apparatus may include means for transmitting, to a network entity and via one or more uplink messages, a set of multiple UE capability values pertaining to UE support of different beam switching delay times for selection of a reception beam at the UE, the different beam switching delay times each associated with a same type of beam switching event, means for receiving, from the network entity, a first downlink message that triggers the beam switching event, and means for switching to the reception beam based on receiving the first downlink message.

A non-transitory computer-readable medium storing code for wireless communication at a UE is described. The code may include instructions executable by a processor to transmit, to a network entity and via one or more uplink messages, a set of multiple UE capability values pertaining to UE support of different beam switching delay times for selection of a reception beam at the UE, the different beam switching delay times each associated with a same type of beam switching event, receive, from the network entity, a first downlink message that triggers the beam switching event, and switch to the reception beam based on receiving the first downlink message.

Some examples of the method, apparatuses, and non-transitory computer-readable medium described herein may further include operations, features, means, or instructions for performing the beam switching event in accordance with a first beam switching delay time of the different beam switching delay times, where the beam switching event includes receiving, at a time that may be the first beam switching delay time after receiving the first downlink message, a second downlink message using the selected reception beam at the UE.

In some examples of the method, apparatuses, and non-transitory computer-readable medium described herein, the first downlink message includes a downlink control information signal including a transmission configuration indicator information, and the second downlink message includes a physical downlink shared channel.

In some examples of the method, apparatuses, and non-transitory computer-readable medium described herein, the first downlink message includes a downlink control information signal, and the second downlink message includes an aperiodic channel state information reference signal.

Some examples of the method, apparatuses, and non-transitory computer-readable medium described herein may further include operations, features, means, or instructions for transmitting, at a time that may be the first beam switching delay time after receiving the first downlink message, an indication of the selected reception beam at the UE, where the first downlink message includes at least one of a downlink reference signal, a synchronization signal block, a channel state information reference signal, or a combination thereof.

In some examples of the method, apparatuses, and non-transitory computer-readable medium described herein, transmitting the set of multiple UE capability values may include operations, features, means, or instructions for periodically transmitting the set of multiple UE capability values pertaining to support, by the UE, of different beam switching delay times for selection of the reception beam at the UE.

Some examples of the method, apparatuses, and non-transitory computer-readable medium described herein may further include operations, features, means, or instructions for determining a change in one or more parameters at the UE, where transmitting the set of multiple UE capability values may be based on the change in the one or more parameters at the UE.

Some examples of the method, apparatuses, and non-transitory computer-readable medium described herein may further include operations, features, means, or instructions for receiving, from the network entity, a request for a predetermined beam switching delay value, where transmitting the set of multiple UE capability values may be based on receiving the request for the predetermined beam switching delay value.

Some examples of the method, apparatuses, and non-transitory computer-readable medium described herein may further include operations, features, means, or instructions for determining an expiry of a timer, where transmitting the set of multiple UE capability values may be in response to the expiry of the timer.

Some examples of the method, apparatuses, and non-transitory computer-readable medium described herein may further include operations, features, means, or instructions for receiving a first capability selection message indicating a first beam switching delay time of the different beam switching delay times and communicating with the network entity in accordance with the first beam switching delay time based on receiving the first capability selection message.

Some examples of the method, apparatuses, and non-transitory computer-readable medium described herein may further include operations, features, means, or instructions for receiving a second capability selection message indicating a second beam switching delay time of the different beam switching delay times, where the second beam switching delay time may be different from the first beam switching delay time and communicating with the network entity in accordance with the second beam switching delay time based on receiving the second capability selection message.

Some examples of the method, apparatuses, and non-transitory computer-readable medium described herein may further include operations, features, means, or instructions for communicating with the network entity includes communicating with the network entity a predetermined time after the receiving the first capability selection message.

In some examples of the method, apparatuses, and non-transitory computer-readable medium described herein, the set of multiple UE capability values indicates a set of multiple indices from a pre-configured table.

In some examples of the method, apparatuses, and non-transitory computer-readable medium described herein, the one or more uplink messages include at least one of a physical uplink shared channel, a physical uplink control channel, a random access channel, a sounding reference signal, or a combination thereof.

In some examples of the method, apparatuses, and non-transitory computer-readable medium described herein, the uplink message includes at least one of a physical uplink shared channel, a physical uplink control channel, a random access channel, a sounding reference signal, or a combination thereof.

A method for wireless communication at a UE is described. The method may include transmitting, to a network entity and via an uplink message, a UE capability value pertaining to UE support of one or more beam switching delay times for selection of a reception beam at the UE for receiving downlink transmission after receiving a channel state information signal with repetition, receiving, from the network entity, the channel state information signal with repetition, and switching to the reception beam based on receiving the channel state information signal with repetition.

An apparatus for wireless communication at a UE is described. The apparatus may include a processor, memory coupled with the processor, and instructions stored in the memory. The instructions may be executable by the processor to cause the apparatus to transmit, to a network entity and via an uplink message, a UE capability value pertaining to UE support of one or more beam switching delay times for selection of a reception beam at the UE for receiving downlink transmission after receiving a channel state information signal with repetition, receive, from the network entity, the channel state information signal with repetition, and switch to the reception beam based on receiving the channel state information signal with repetition.

Another apparatus for wireless communication at a UE is described. The apparatus may include means for transmitting, to a network entity and via an uplink message, a UE capability value pertaining to UE support of one or more beam switching delay times for selection of a reception beam at the UE for receiving downlink transmission after receiving a channel state information signal with repetition, means for receiving, from the network entity, the channel state information signal with repetition, and means for switching to the reception beam based on receiving the channel state information signal with repetition.

A non-transitory computer-readable medium storing code for wireless communication at a UE is described. The code may include instructions executable by a processor to transmit, to a network entity and via an uplink message, a UE capability value pertaining to UE support of one or more beam switching delay times for selection of a reception beam at the UE for receiving downlink transmission after receiving a channel state information signal with repetition, receive, from the network entity, the channel state information signal with repetition, and switch to the reception beam based on receiving the channel state information signal with repetition.

Some examples of the method, apparatuses, and non-transitory computer-readable medium described herein may further include operations, features, means, or instructions for receiving, from the network entity, a delay parameter indicating a time period after the channel state information signal and assuming an absence of downlink messages during the time period after receiving the channel state information signal based on the delay parameter.

In some examples of the method, apparatuses, and non-transitory computer-readable medium described herein, the UE capability value may be based on a subcarrier spacing, a number of antenna panels at the UE, a periodicity of the channel state information signal, a slot resolution, a symbol resolution, a number of channel state information reference signal resources used in a beam training session, or a combination thereof.

A method for wireless communication at a network entity is described. The method may include receiving, from a UE and via one or more uplink messages, a set of multiple UE capability values pertaining to UE support of different beam switching delay times for selection of a reception beam at the UE, the different beam switching delay times each associated with a same type of beam switching event, transmitting, to the UE, a first downlink message that triggers the beam switching event, and communicating with the UE in accordance with one of the different beam switching delay times based on transmitting the first downlink message.

An apparatus for wireless communication at a network entity is described. The apparatus may include a processor, memory coupled with the processor, and instructions stored in the memory. The instructions may be executable by the processor to cause the apparatus to receive, from a UE and via one or more uplink messages, a set of multiple UE capability values pertaining to UE support of different beam switching delay times for selection of a reception beam at the UE, the different beam switching delay times each associated with a same type of beam switching event, transmit, to the UE, a first downlink message that triggers the beam switching event, and communicate with the UE in accordance with one of the different beam switching delay times based on transmitting the first downlink message.

Another apparatus for wireless communication at a network entity is described. The apparatus may include means for receiving, from a UE and via one or more uplink messages, a set of multiple UE capability values pertaining to UE support of different beam switching delay times for selection of a reception beam at the UE, the different beam switching delay times each associated with a same type of beam switching event, means for transmitting, to the UE, a first downlink message that triggers the beam switching event, and means for communicating with the UE in accordance with one of the different beam switching delay times based on transmitting the first downlink message.

A non-transitory computer-readable medium storing code for wireless communication at a network entity is described. The code may include instructions executable by a processor to receive, from a UE and via one or more uplink messages, a set of multiple UE capability values pertaining to UE support of different beam switching delay times for selection of a reception beam at the UE, the different beam switching delay times each associated with a same type of beam switching event, transmit, to the UE, a first downlink message that triggers the beam switching event, and communicate with the UE in accordance with one of the different beam switching delay times based on transmitting the first downlink message.

Some examples of the method, apparatuses, and non-transitory computer-readable medium described herein may further include operations, features, means, or instructions for determining that the beam switching event may be performed in accordance with a first beam switching delay time of the different beam switching delay times, where the beam switching event includes transmitting, at a time that may be the first beam switching delay time after transmitting the first downlink message, a second downlink message using the selected reception beam at the UE.

In some examples of the method, apparatuses, and non-transitory computer-readable medium described herein, the first downlink message includes a downlink control information signal including a transmission configuration indicator information, and the second downlink message includes a physical downlink shared channel.

In some examples of the method, apparatuses, and non-transitory computer-readable medium described herein, the first downlink message includes a downlink control information signal, and the second downlink message includes an aperiodic channel state information reference signal.

Some examples of the method, apparatuses, and non-transitory computer-readable medium described herein may further include operations, features, means, or instructions for receiving, at a time that may be the first beam switching delay time after transmitting the first downlink message, an indication of the selected reception beam at the UE, where the first downlink message includes at least one of a downlink reference signal, a synchronization signal block, a channel state information reference signal, or a combination thereof.

In some examples of the method, apparatuses, and non-transitory computer-readable medium described herein, receiving the set of multiple UE capability values may include operations, features, means, or instructions for periodically receiving the set of multiple UE capability values pertaining to support, by the UE, of different beam switching delay times for selection of the reception beam at the UE.

Some examples of the method, apparatuses, and non-transitory computer-readable medium described herein may further include operations, features, means, or instructions for receiving the set of multiple UE capability values based on a change in one or more parameters at the UE or may be in response to an expiry of a timer.

Some examples of the method, apparatuses, and non-transitory computer-readable medium described herein may further include operations, features, means, or instructions for transmitting, to the UE, a request for a predetermined beam switching delay value, where receiving the set of multiple UE capability values may be based on transmitting the request for the predetermined beam switching delay value.

Some examples of the method, apparatuses, and non-transitory computer-readable medium described herein may further include operations, features, means, or instructions for transmitting a first capability selection message indicating a first beam switching delay time of the different beam switching delay times and communicating with the UE in accordance with the first beam switching delay time based on transmitting the first capability selection message.

Some examples of the method, apparatuses, and non-transitory computer-readable medium described herein may further include operations, features, means, or instructions for transmitting a second capability selection message indicating a second beam switching delay time of the different beam switching delay times, where the second beam switching delay time may be different from the first beam switching delay time and communicating with the UE in accordance with the second beam switching delay time based on transmitting the second capability selection message.

A method for wireless communication at a network entity is described. The method may include receiving, from a UE and via an uplink message, a UE capability value pertaining to UE support of one or more beam switching delay times for selection of a reception beam at the UE for receiving downlink transmission after receiving a channel state information signal with repetition, transmitting, to the UE, the channel state information signal with repetition, and communicating with the UE in accordance with one of the one or more beam switching delay times based on transmitting the channel state information signal with repetition.

An apparatus for wireless communication at a network entity is described. The apparatus may include a processor, memory coupled with the processor, and instructions stored in the memory. The instructions may be executable by the processor to cause the apparatus to receive, from a UE and via an uplink message, a UE capability value pertaining to UE support of one or more beam switching delay times for selection of a reception beam at the UE for receiving downlink transmission after receiving a channel state information signal with repetition, transmit, to the UE, the channel state information signal with repetition, and communicate with the UE in accordance with one of the one or more beam switching delay times based on transmitting the channel state information signal with repetition.

Another apparatus for wireless communication at a network entity is described. The apparatus may include means for receiving, from a UE and via an uplink message, a UE capability value pertaining to UE support of one or more beam switching delay times for selection of a reception beam at the UE for receiving downlink transmission after receiving a channel state information signal with repetition, means for transmitting, to the UE, the channel state information signal with repetition, and means for communicating with the UE in accordance with one of the one or more beam switching delay times based on transmitting the channel state information signal with repetition.

A non-transitory computer-readable medium storing code for wireless communication at a network entity is described. The code may include instructions executable by a processor to receive, from a UE and via an uplink message, a UE capability value pertaining to UE support of one or more beam switching delay times for selection of a reception beam at the UE for receiving downlink transmission after receiving a channel state information signal with repetition, transmit, to the UE, the channel state information signal with repetition, and communicate with the UE in accordance with one of the one or more beam switching delay times based on transmitting the channel state information signal with repetition.

In some examples of the method, apparatuses, and non-transitory computer-readable medium described herein, the UE capability value may be based on a subcarrier spacing, a number of antenna panels at the UE, a periodicity of the channel state information signal, a slot resolution, a symbol resolution, a number of channel state information reference signal resources used in a beam training session, or a combination thereof.

DETAILED DESCRIPTION

Figure 1:
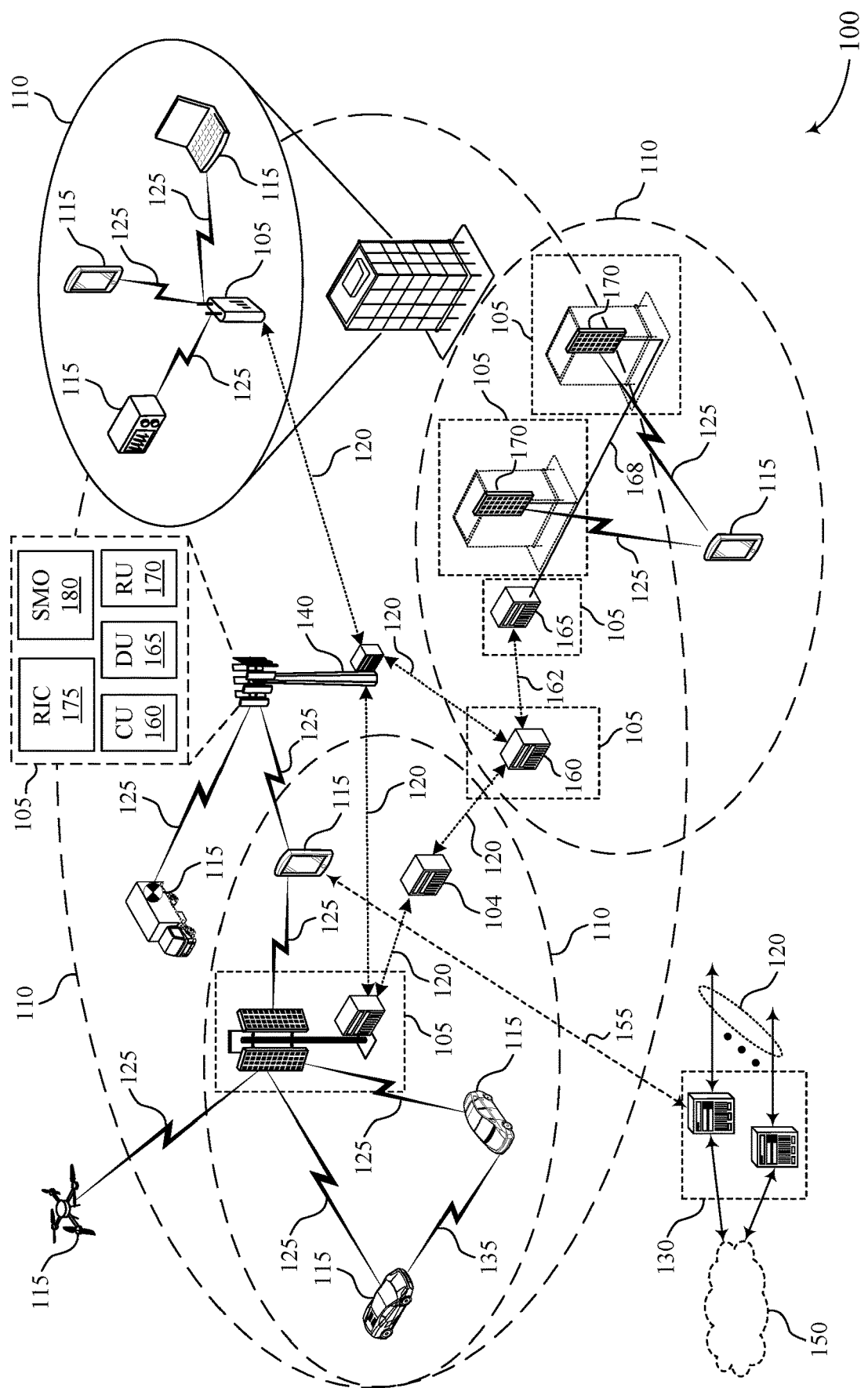
FIG. 1 illustrates an example of a wireless communications system that supports dynamic beam switching delay capability in accordance with one or more aspects of the present disclosure.

Some wireless communications systems may support beam selection and refinement as part of a beam switch procedure during wireless communications between a user equipment (UE) and a network entity. The beam switch procedure may involve delays (e.g., timings) between operations, which may give the UE time for performing operations associated with the beam switch procedure. The delays may be specific to a UE and may be based on the capability of the UE. For example, a slower, less complex, or power-saving UE may report a slow capability, associated with longer delays during beam switch procedures. Alternatively, a UE may prioritize performance and low latency and may report a fast capability, associated with shorter delays during beam switch procedures. However, wireless communications systems support fixed delays, and the UE may not be allowed to switch capabilities and use different delays as parameters at the UE change. For instance, a UE may switch from a power-saving mode to a high performance mode but may not be able to report a faster capability associated with shorter delays thus experiencing higher latency. Similarly, a UE that has switched from a high performance mode to a power saving mode may not be able to report a slower capability associated with longer delays and may experience higher power consumption. Thus, UEs may be unable to accommodate for different user needs, hampering the user experience.

According to one or more aspects of the present disclosure, the UE may dynamically change and report beam switching delay capabilities. For example, the UE may update the capability to a network entity periodically when the complexity, power, or memory needs of the UE change. Additionally, or alternatively, the UE may update the capability upon being triggered by the network entity, during a time scheduled by the network entity, upon the expiration of a timer, etc. The capabilities may be or may include explicit values for beam switching delay, or an index selecting values from a table previously configured (e.g., pre-configured) for the UE, for example. In some cases, the UE may indicate more than one capability in a message (e.g., a fast and slow capability), and the network entity may indicate the UE to assume beam switching delay values corresponding to one of the capabilities until a next indication, for a predefined time, or until some event, for example. Accordingly, the UE may avoid higher power consumption or high latency scenarios caused by fixed beam switching delay capabilities.

One or more aspects depicted herein further provide that the UE may report capability values associated with a time delay between a transmitted channel state information reference signal (CSI-RS) with repetition and the UE being ready for a downlink transmission using a beam selected based on the CSI-RS. This capability may indicate to a network entity to avoid scheduling downlink messages following the CSI-RS but prior to the expiration of the time delay. Thus, the UE can assume that no message will be transmitted and may avoid buffering until after the delay, leading to decreased power consumption.

Aspects of the disclosure are initially described in the context of wireless communications systems. Aspects of the disclosure are additionally described in the context of process flow and diagrams. Aspects of the disclosure are further illustrated by and described with reference to apparatus diagrams, system diagrams, and flowcharts that relate to dynamic beam switching delay capability.

FIG. 1 illustrates an example of a wireless communications system 100 that supports dynamic beam switching delay capability in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or another interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support dynamic beam switching delay capability as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may support beam selection and refinement as part of a beam switch procedure during wireless communication between a UE 115 and a network entity 105. The beam switch procedure may include delays (e.g., timings) in between operations. The UE 115 may use the delay to perform operations associated with the beam switch procedure. The delays or the time between beam switch operations may be specific to a UE 115 and may be based on the capability of the UE 115. For example, a slower, less complex, or power-saving UE 115 may report a slow capability, leading to longer delays during beam switch procedures. Alternatively, a UE 115 may prioritize performance and low latency and may report a fast capability, leading to shorter delays during beam switch procedures. However, if a wireless communications system 100 operates using fixed delays, the UE 115 may not be able to switch capabilities and use different delays as parameters at the UE change. Additionally, or alternatively, different UEs 115 may not be able to report different delay values. Thus, the wireless communications system 100 may be unable to accommodate for different user needs, hampering the user experience.

In some examples, the UE 115 may select a spatial filter to receive downlink messages following a reference signal transmission (e.g., a CSI-RS) with repetition as part of a receive beam refinement procedure (e.g., a P-3 procedure). The processing and selection time for the UE 115 may be relatively quick and may be absorbed into a cyclic prefix length time. However, the UE 115 may take additional time to perform processing and selection in some cases, such as when the UE 115 supports beam switching between multiple antenna panels or the network entity 105 and the UE 115 are communicating according to a relatively high subcarrier spacing that may be associated with a relatively short cyclic prefix length. This may lead to decreased performance by the UE 115.

In some implementations according to aspects of the present disclosure, wireless communications system 100 may support a UE 115 dynamically changing and reporting beam switching delay capabilities. For example, the UE 115 may update the capability to a network entity periodically when the complexity, power, or memory needs of the UE 115 change. Additionally, or alternatively, the UE 115 may update the capability upon being triggered by a network entity 105, during a time scheduled by the network entity 105, or upon the expiration (e.g., expiry) of a timer, etc. The capabilities may be or may include explicit values for beam switching delay, or an index selecting values from a table previously configured (e.g., pre-configured) to the UE 115, for example. In some cases, the UE 115 may indicate more than one capability in a message (e.g., a fast capability or a slow capability), and the network entity 105 may indicate the UE 115 to assume beam switching delay values corresponding to one of the capabilities until a next indication, for a predefined time, or until some event, for example. Accordingly, the UE 115 may avoid higher power consumption or high latency scenarios caused by fixed beam switching delay capabilities.

The wireless communications system 100 may support a UE 115 reporting capability values associated with a time delay between a transmitted reference signal (e.g., a CSI-RS) with repetition and the UE 115 being ready for a downlink transmission using a beam selected based on the reference signal. This capability may indicate to a network entity 105 to avoid scheduling downlink messages following the reference signal transmission but prior to the expiration of the time delay. Thus, the UE 115 can assume no message will be transmitted and may avoid buffering until after the delay, leading to decreased power consumption.

Figure 2:
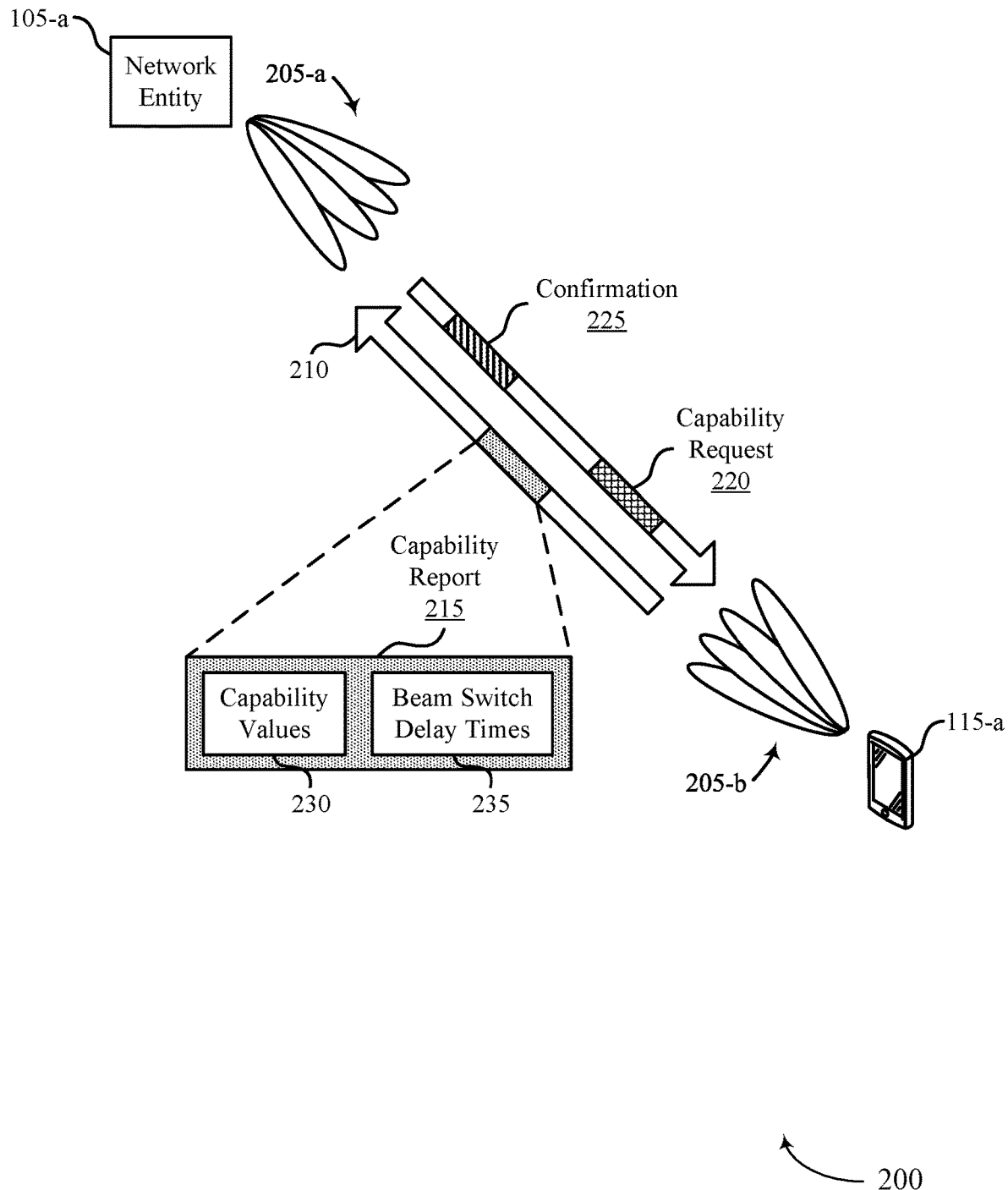
FIG. 2 illustrates an example of a wireless communications system that supports dynamic beam switching delay capability in accordance with one or more aspects of the present disclosure.

FIG. 2 illustrates an example of a wireless communications system 200 that supports dynamic beam switching delay capability in accordance with one or more aspects of the present disclosure. The wireless communications system 200 may implement or be implemented to realize aspects of the wireless communications system 100. For example, the wireless communications system 200 may illustrate communications between a UE 115-a and a network entity 105-a, which may be examples of corresponding devices described herein, including with reference to FIG. 1. Further, the UE 115-a and the network entity 105-a may communicate messages using communication links 210, which may be examples of a communication link 125 described herein, with reference to FIG. 1. The UE 115-a and the network entity 105-a may also support beamformed communications. For example, the UE 115-a and the network entity 105-a may transmit and receive messages using one or more respective beams 205 selected and refined, for example, in accordance with a beam switch procedure (e.g., a beam selection procedure).

The UE 115-a and the network entity 105-a may support performing beam switch procedures (e.g., events) according to various UE capability values 230 and beam switching delay times 235. For example, the beam switch procedure may involve a transmit beam selection step (e.g., a P-1 procedure), a downlink transmit beam refinement step (e.g., a P-2 procedure), and a UE 115-a receive beam refinement step (e.g., a P-3 procedure), and there may be beam switching delay times 235 throughout these steps to allow time for the UE 115-a to read and process downlink control information (DCI) received from the network entity 105-a. In some cases, the UE 115-a may support transmitting a capability report 215 to the network entity 105-a indicating (e.g., containing, comprising, etc.) one or more capability value 230 pertaining to supporting one or more beam switch delay times 235. For example, the UE may include a capability value 230 corresponding to a fast beam switch capability (e.g., for high-performance and low latency operations) associated with shorter beam switch delay times 235, and a capability value 230 corresponding to a slow beam switch capability (e.g., for power-saving) associated with longer beam switch delay times 235.

In some cases, the UE 115-a may be configured to transmit a capability report 215 periodically (e.g., according to a timing or expiration of a timer). Additionally, or alternatively, the UE 115-a may be configured to transmit a capability report 215 as the complexity, power, latency, or memory needs change at the UE 115-a, and the UE 115-a decides to switch to a different capability. For example, as the UE 115-a determines to switch from a fast beam switch capability to a slow beam switch capability to conserve power, the UE 115-a may transmit a capability report 215 including a capability value 230 corresponding to the slow beam switch capability. In some cases, the network entity 105-a may trigger the UE 115-a to transmit a capability report 215 by transmitting a capability request 220. Additionally, or alternatively, the network entity 105-a may schedule a time for the UE 115-a to transmit the capability report 215 and indicate the time to the UE 115-a in the capability request 220. In some cases, the UE 115-a may transmit the capability report 215 after a timer indicated in the capability request 220 by the network entity 105-a is elapsed. In some cases, the network entity 105-a may configure one or more times for the UE 115-a to transmit the capability report 215 as part of a scheduling pattern. In some examples, the network entity 105-a may transmit a confirmation 225 in response to receiving the capability report 215. Thus, the UE 115-a may transmit multiple capability values pertaining to the UE 115-a's support of different beam switching delay times for selection of a reception beam at the UE 115-a, the different beam switching delay times each associated with a same type of beam switching event.

The UE 115-a may transmit the capability report 215 in an uplink message, which may be, for example, a physical uplink shared channel transmission, a physical uplink control channel transmission, a random access channel transmission, a sounding reference signal, etc. The capability report 215 may include multiple capability values 230, each associated with one or more beam switch delay times 235. For example, the UE 115-a may transmit two capability values 230 corresponding to a fast and a slow capability, and each may be associated with a different value (e.g., an index corresponding to a table value) for a beam switch delay time 235 corresponding to a time between a DCI containing a transmission configuration indicator and the UE 115-a being ready to receive a physical downlink shared channel transmission from the network entity 105-a during a beam switch event. In response to the capability report 215, the network entity 105-a may indicate or request the UE 115-a to assume one of the indicated capability values. The indication may be valid until the network entity 105-a transmits a next indication to the UE 115-a. Alternatively, the indication may be valid until the expiration of a timer (e.g., indicated by the network entity 105-a) or until a predefined event (e.g., a scheduling pattern, internal event at the UE 115-a, etc.).

The beam switch delay times 235 may correspond to one or more values for the UE 115-a to perform operations relating to a beam switch event. For example, a beam switch delay time 235 may be the time between reception of a DCI including a transmission configuration indicator and the UE 115-a being ready to receive a physical downlink shared channel transmission from the network entity 105-a to the UE 115-*a*; time for the UE 115-*a* to become ready to receive an aperiodic channel state information reference signal (CSI-RS) following a DCI trigger; and the time between a downlink reference signal (e.g., a CSI-RS, a synchronization signal block (SSB) reference signal, etc.) and an uplink beam report from the UE 115-*a*, among other examples. In some examples, the UE 115-*a* may be configured (e.g., pre-configured by the network entity 105-*a*) with a table containing multiple options for each of multiple beam switch delay times 235. Each option may be associated with an index, which the UE 115-*a* may include in the capability report 215 in order to indicate desired beam switch delay times 235 corresponding to a capability value 230. Alternatively, the UE 115-*a* may indicate the explicit values for the desired beam switch delay times 235.

In some examples, the UE 115-*a* may transmit a capability report 215 indicating a capability value 230 associated with one or more beam switch delay times 235 corresponding to the time between a CSI-RS with repetition (e.g., repetition set to ON) during a beam training session (e.g., for P-3, the receive beam refinement step) and the UE 115-*a* being ready to receive a downlink transmission using the selected receive beam. The capability may be dependent on a sub-carrier spacing (SCS) associated with transmissions between the UE 115-*a* and the network entity 105-*a*, a number of antenna panels available at the UE 115-*a*, a periodicity of the CSI-RS (e.g., periodic, aperiodic, or semi-persistent), a slot or sub-slot resolution for transmissions, a symbol or sub-symbol resolution for transmissions (e.g., for higher SCS, the capability may be based on a half symbol if a single carrier waveform is used), a number of CSI-RS resources used during the beam training session, or any combination thereof.

In response to the capability report 215, the network entity 105-*a* may refrain from transmitting a downlink message before the beam switch delay time 235. The network entity 105-*a* may configure the UE 115-*a* with a delay so that the UE 115-*a* may assume that no downlink message will be scheduled before this delay elapses after the CSI-RS with repetition. Therefore, the UE 115-*a* may refrain from buffering and listening for downlink messages using the selected beam until the delay elapses.

Figure 3:
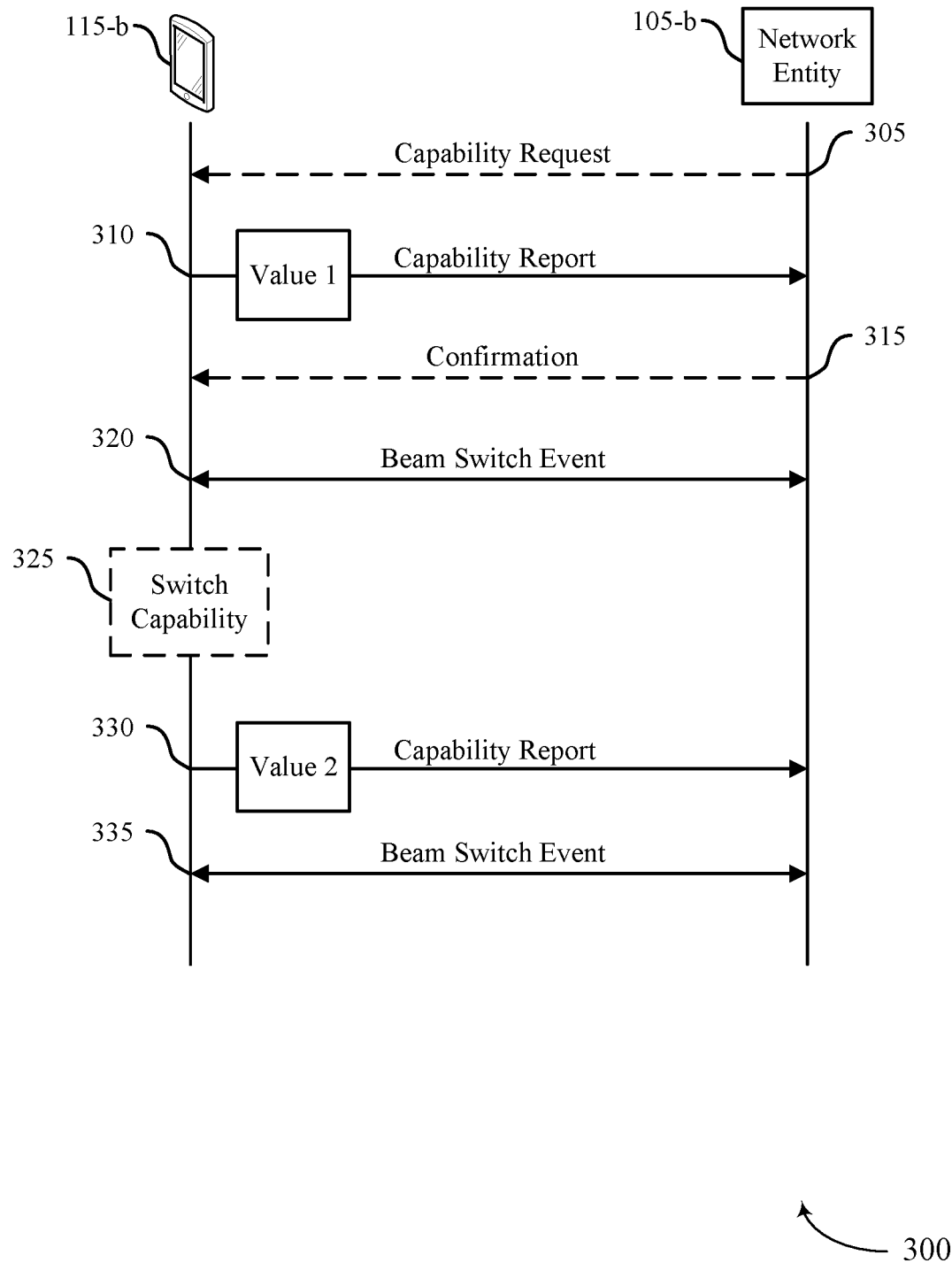
FIG. 3 illustrates an example of a process flow that supports dynamic beam switching delay capability in accordance with one or more aspects of the present disclosure.

FIG. 3 illustrates an example of a process flow 300 that supports dynamic beam switching delay capability in accordance with one or more aspects of the present disclosure. The process flow 300 may implement aspects of the wireless communications system 100 and the wireless communications system 200. For example, the process flow 300 may illustrate communications between a UE 115-*b* and a network entity 105-*b*, which may be examples of corresponding devices described herein, including with reference to FIGS. 1 and 2. In some examples, the UE 115-*b* may dynamically report capability reports associated with a beam switching procedure to the network entity 105-*b*.

In the following description of the process flow 300, the operations may be performed (e.g., reported or provided) in a different order than the order shown. Specific operations also may be left out of the process flow 300, or other operations may be added to the process flow 300. Further, although some operations or signaling may be shown to occur at different times for discussion purposes, these operations may actually occur at the same time.

At 305, the network entity 105-*b* may request the UE 115-*b* to transmit a capability report. The network entity 105-*b* may configure the UE 115-*b* with a delay or timer, such that after the configured timer elapses following the capability request, the UE 115-*a* may transmit the capability report. Additionally, or alternatively, the network entity 105-*a* may configure the UE 115-*b* with a scheduling pattern for transmitting capability reports.

At 310, the UE 115-*b* may transmit a capability report indicating a first capability value (i.e., value 1) associated with one or more beam switch delay times supported by the UE 115-*b*. The capability report may indicate the beam switch delay times by including one or more indexes associated with a table including values for the beam switch delay times corresponding to the beam switch event. Additionally, or alternatively, the UE 115-*b* may include explicit values for the beam switch delay times in the capability report. In some examples, the UE 115-*b* may transmit the capability report in response to a capability request form the network entity 105-*b*. Alternatively, the UE 115-*b* may transmit the capability report as part of a periodic transmission, or in response to the complexity, power, latency, or memory needs of the UE 115-*b* changing.

At 315, the network entity 105-*b* may send a confirmation in response to the capability report. For example, the network entity 105-*b* may indicate the UE 115-*a* to assume beam switch delay times associated with the predetermined capability value 1. In some cases, the UE 115-*a* may assume the beam switch delay times associated with the predetermined capability value 1 without receiving a confirmation from the network entity 105-*b*.

At 320, the network entity 105-*b* and the UE 115-*b* may engage in a beam switch event. For example, the beam switching event may be a transmit beam selection step (e.g., P-1), a downlink transmit beam refinement step (e.g., P-2), a UE 115-*a* receive beam refinement step (e.g., P-3), or a combination thereof. The beam switch event may incorporate the beam switch delay times to allow time for the UE 115-*a* to perform operations associated with the beam switch event. For example, a beam switch delay time may be a delay between the UE 115-*b* receiving a message (e.g., DCI) from the network entity 105-*b* and the UE 115-*b* switching beams. The UE 115-*b* and the network entity 105-*b* may perform the beam switch event according to the beam switch delay times corresponding to the capability value 1 indicated in the capability report.

At 325, the UE 115-*b* may determine a change in complexity, power, latency, memory needs, or other parameters, and switch to a second capability for performing beam switch events. For example, the UE 115-*b* may enter a power-saving mode and switch to a slow capability associated with longer beam switch delay times which may reduce power consumption. The longer beam switch delay times may allow for reduced processing power and cycles, reduced buffering needs, and micro-sleep during the delays at the UE 115-*b* leading to reduced memory and power consumption. Alternatively, the UE 115-*b* may enter a high-performance or low-latency mode and prioritize faster procedures over power savings. In this case, the second capability may be associated with shorter beam switch delay times to decrease latency.

At 330, the UE 115-*b* may transmit a second capability report indicating a second capability value (i.e., value 2) associated with one or more beam switch delay times supported by the UE 115-*b*. The capability report may indicate the beam switch delay times by including one or more indexes associated with a table containing values for the beam switch delay times corresponding to the beam switch event. Additionally, or alternatively, the UE 115-*b* may include explicit values for the beam switch delay times in the capability report. In some examples, the UE 115-*b* may transmit the capability report in response to a capability request form the network entity 105-b. Alternatively, the UE 115-b may transmit the capability report as part of a periodic transmission, or in response to the complexity, power, latency, or memory needs of the UE 115-b changing.

At 335, the network entity 105-b and the UE 115-b may engage in a second beam switch event. For example, the beam switching event may be a transmit beam selection step (e.g., P-1), a downlink transmit beam refinement step (e.g., P-2), a UE 115-a receive beam refinement step (e.g., P-3), or a combination thereof. The beam switch event may incorporate the second beam switch delay times to allow time for the UE 115-a to perform operations associated with the beam switch event.

Figure 4:
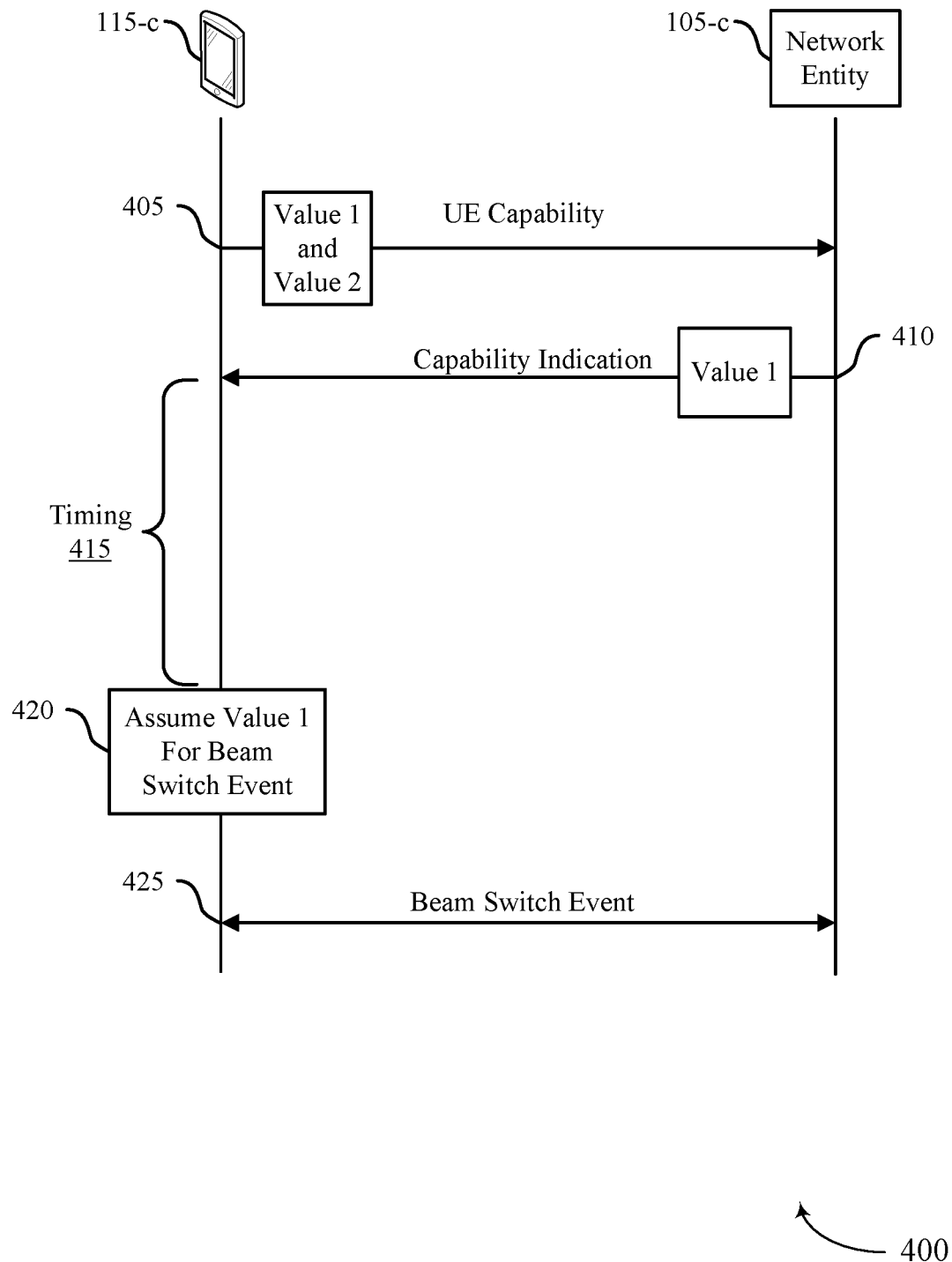
FIG. 4 illustrates an example of a process flow that supports dynamic beam switching delay capability in accordance with one or more aspects of the present disclosure.

FIG. 4 illustrates an example of a process flow 400 that supports dynamic beam switching delay capability in accordance with one or more aspects of the present disclosure. The process flow 400 may implement aspects of the process flow 300, the wireless communications system 100, and the wireless communications system 200. For example, the process flow 300 may illustrate communications between a UE 115-c and a network entity 105-c, which may be examples of corresponding devices described herein, including with reference to FIGS. 1, 2 and 3. In some examples, the UE 115-c may dynamically report capability reports associated with a beam switching procedure to the network entity 105-c.

In the following description of the process flow 400, the operations may be performed (e.g., reported or provided) in a different order than the order shown. Specific operations also may be left out of the process flow 400, or other operations may be added to the process flow 400. Further, although some operations or signaling may be shown to occur at different times for discussion purposes, these operations may actually occur at the same time.

At 405, the UE 115-c may transmit a capability report indicating (e.g., containing, comprising, etc.) multiple capability values (i.e., value 1 and value 2), where each capability value is associated with one or more beam switch delay times supported by the UE 115-c. For example, value 1 may correspond to a fast capability associated with shorter beam switch delay times, while value 2 may correspond to a slow capability associated with longer beam switch delay times. The capability report may indicate the one or more beam switch delay times by including one or more indexes associated with a table containing values for the beam switch delay times corresponding to a beam switch event. Additionally, or alternatively, the UE 115-c may include explicit values for the beam switch delay times in the capability report. In some examples, the UE 115-c may transmit the capability report in response to a capability request form the network entity 105-c scheduling a capability report. Alternatively, the UE 115-c may transmit the capability report as part of a periodic transmission, or in response to the complexity, power, latency, or memory needs of the UE 115-c changing.

At 410, the network entity 105-c may indicate the UE 115-c to assume the beam switch delay times associated with capability value 1. The network entity 105-c may determine to indicate the value 1 based on the current needs (e.g., complexity, power, latency, or memory needs) of the system or the UE 115-c. The indication may be valid until the network entity 105-c transmits a following indication to the UE 115-c. Alternatively, the indication may be valid until the expiration (e.g., expiry) of a timer (e.g., indicated by the network entity 105-c) or until a predefined event (e.g., a scheduling pattern, internal event at the UE 115-c, etc.). The network entity 105-c may configure the UE 114 c with a timing 415, so that the UE 115-c may assume the beam switch delay times after the timing 415 has elapsed following the capability indication.

At 420, the UE 115-c may assume the beam switch delay times associated with capability value 1 for beam switch events. The UE 115-c may assume the beam switch delay times after the timing 415 has elapsed.

At 425, the network entity 105-c and the UE 115-c may engage in a beam switch event. For example, the beam switching event may be a transmit beam selection step (e.g., P-1), a downlink transmit beam refinement step (e.g., P-2), a UE 115-a receive beam refinement step (e.g., P-3), or a combination thereof. The beam switch event may incorporate the beam switch delay times to allow time for the UE 115-a to perform operations associated with the beam switch event. For example, a beam switch delay time may be a delay between the UE 115-c receiving a message (e.g., DCI) from the network entity 105-c and the UE 115-c switching beams. The UE 115-c and the network entity 105-c may perform the beam switch event according to the beam switch delay times corresponding to the capability value 1 indicated in the capability indication.

Figure 5:
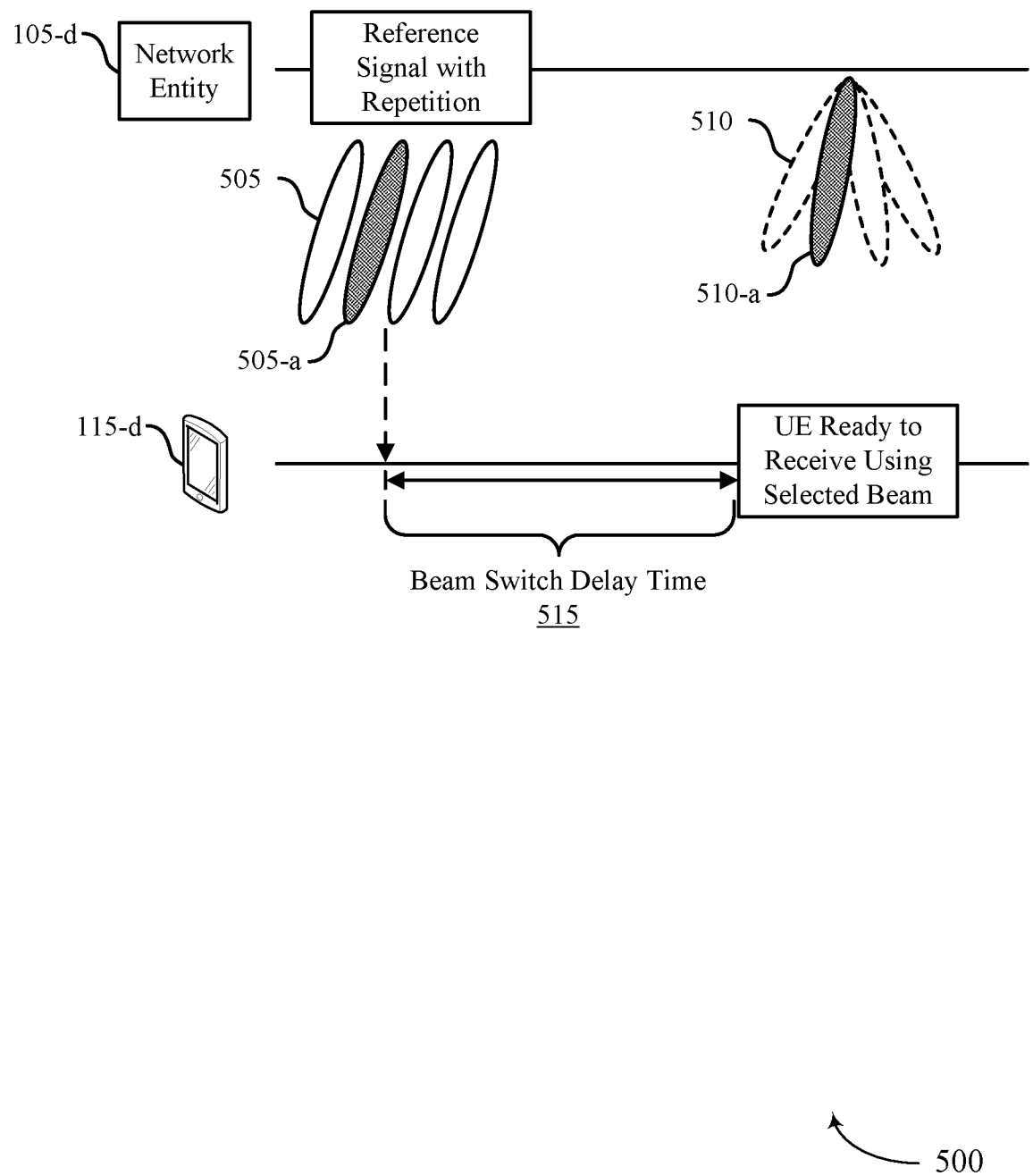
FIG. 5 illustrates an example of a process flow that supports dynamic beam switching delay capability in accordance with one or more aspects of the present disclosure.

FIG. 5 illustrates an example of a process flow 500 that supports dynamic beam switching delay capability in accordance with one or more aspects of the present disclosure. The process flow 500 may implement aspects of process flows 300 and 400, and wireless communications systems 100 and 200. For example, the process flow 500 may illustrate communications between a UE 115-d and a network entity 105-d, which may be examples of corresponding devices described herein.

In some examples, the UE 115-d and the network entity 105-d may operate according to a capability associated with a beam switch delay time 515 corresponding to the time between transmission of a reference signal (e.g., CSI-RS) with repetition (e.g., repetition set to ON) during a beam training session (e.g., for a P-3 procedure) and the UE 115-d being ready to receive a downlink transmission using the selected receive beam.

Transmitting the reference signal with repetition may involve the network entity 105-d transmitting multiple reference signals with a common transmit beam 505 in quick succession. The beam used for the repeated transmission may be a transmit beam 505-a selected in a previous beam switch event (e.g., during a P-2 event). The UE 115-d may sweep receive beams 510 and select a receive beam 510-a based on the transmission of the reference signal with repetition.

The network entity 105-d may refrain from transmitting a downlink message before the beam switch delay time 515 elapses. The network entity 105-d may configure the UE 115-d with the beam switch delay time 515 so that the UE 115-d may assume that no downlink message will be scheduled before this delay elapses after the reference signal with repetition. Therefore, the UE 115-d may refrain from buffering and listening for downlink messages using the selected beam until the delay elapses.

The capability and the beam switch delay time 515 may be dependent on a subcarrier spacing (SCS) associated with transmissions between the UE 115-d and the network entity 105-d, a number of antenna panels available at the UE 115-d, a periodicity of the reference signal (e.g., periodic, aperiodic, or semi-persistent), a slot or sub-slot resolution for transmissions, a symbol or sub-symbol resolution for transmissions (e.g., for higher SCS, the capability may be based on a half symbol if a single carrier waveform is used), a number of reference signal resources used during the beam training session, or any combination thereof. After the beam switch delay time 515 elapses, the UE 115-*d* may be ready to begin receiving downlink messages according to the selected receive beam 510-*a*.

Figure 6:
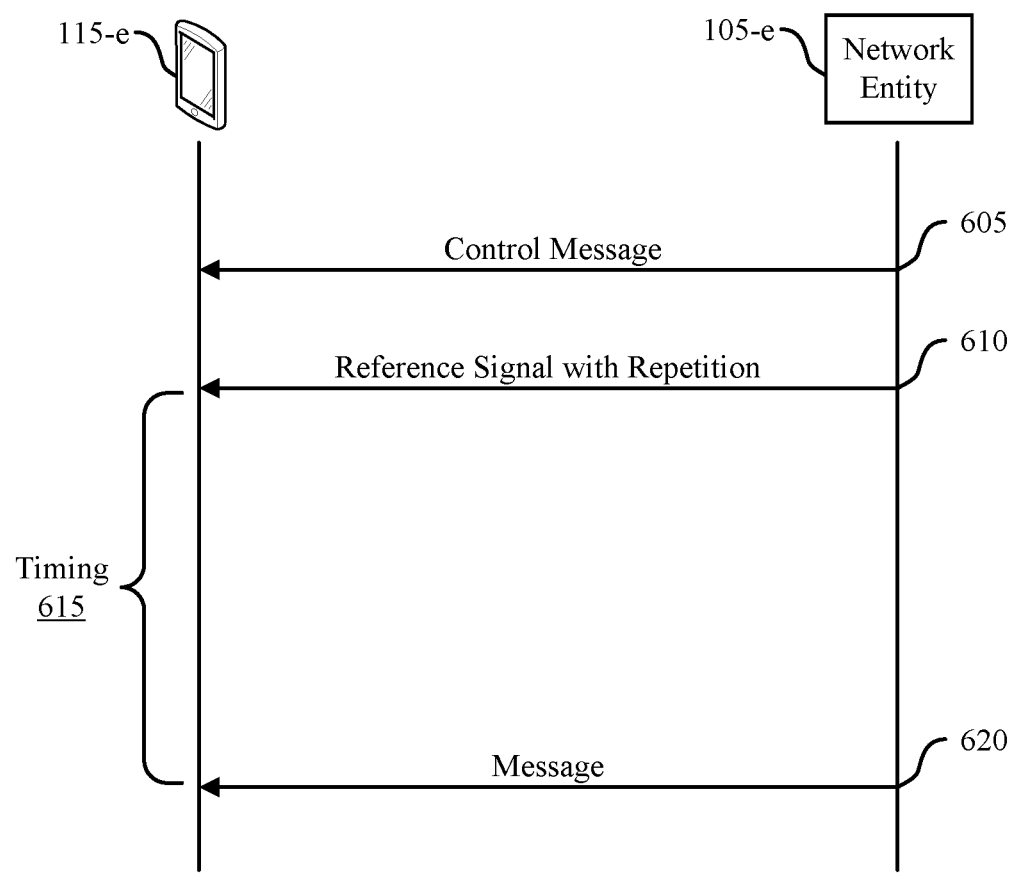
FIG. 6 illustrates an example of a process flow that supports dynamic beam switching delay capability in accordance with one or more aspects of the present disclosure.

FIG. 6 illustrates an example of a process flow 600 that supports dynamic beam switching delay capability in accordance with one or more aspects of the present disclosure. The process flow 600 may implement aspects of process flows 300 and 400, wireless communications systems 100 and 200, and process flow 500. For example, the process flow 600 may illustrate communications between a UE 115-3 and a network entity 105-3, which may be examples of corresponding devices described herein. In some examples, the UE 115-*e* may dynamically report capability reports associated with a beam switching procedure to the network entity 105-*e*.

In the following description of the process flow 600, the operations may be performed (e.g., reported or provided) in a different order than the order shown. Specific operations also may be left out of the process flow 600, or other operations may be added to the process flow 600. Further, although some operations or signaling may be shown to occur at different times for discussion purposes, these operations may actually occur at the same time.

At 605, the network entity 105-*e* may transmit a control message (e.g., DCI) to the UE 115-*e*. The control message may indicate (e.g., schedule) the UE 115-*e* of an upcoming reference signal transmission with repetition and, in some cases, a subsequent message. In some examples, the control message may indicate to the UE 115-*e* of a timing 615 during which the UE 115-*e* can assume that no messages will be transmitted by the network entity 105-*e* in accordance with a capability of the UE 115-*e* as described herein, with reference to FIG. 5. For example, the capability and the timing 620 may be dependent on a subcarrier spacing (SCS) associated with transmissions between the UE 115-*e* and the network entity 105-*e*, a number of antenna panels available at the UE 115-*e*, a periodicity of the reference signal (e.g., periodic, aperiodic, or semi-persistent), a slot or sub-slot resolution for transmissions, a symbol or sub-symbol resolution for transmissions (e.g., for higher SCS, the capability may be based on a half symbol if a single carrier waveform is used), a number of reference signal resources used during the beam training session, or any combination thereof.

At 610, the network entity 105-*e* may transmit the reference signal (e.g., a CSI-RS) with repetition, which may involve the network entity 105-*e* transmitting multiple reference signals with a common transmit beam in quick succession. The beam used for the repeated transmission may be a transmit beam selected in a previous beam switch event (e.g., during a P-2 event). The UE 115-*e* may sweep receive beams and select a receive beam based on the transmission of the reference signal with repetition. The network entity 105-*e* may refrain from transmitting any messages to the UE 115-*e* until the timing 615 has elapsed. As such, the UE 115-*e* may avoid buffering and listening for messages using the selected receive beam until the timing 615 has elapsed.

At 620, the network entity 105-*e* may transmit a message (e.g., a PDSCH) to the UE 115-*e* using the transmit beam after the timing 615 has elapsed. The UE 115-*e* may receive the message using the selected receive beam.

Figure 7:
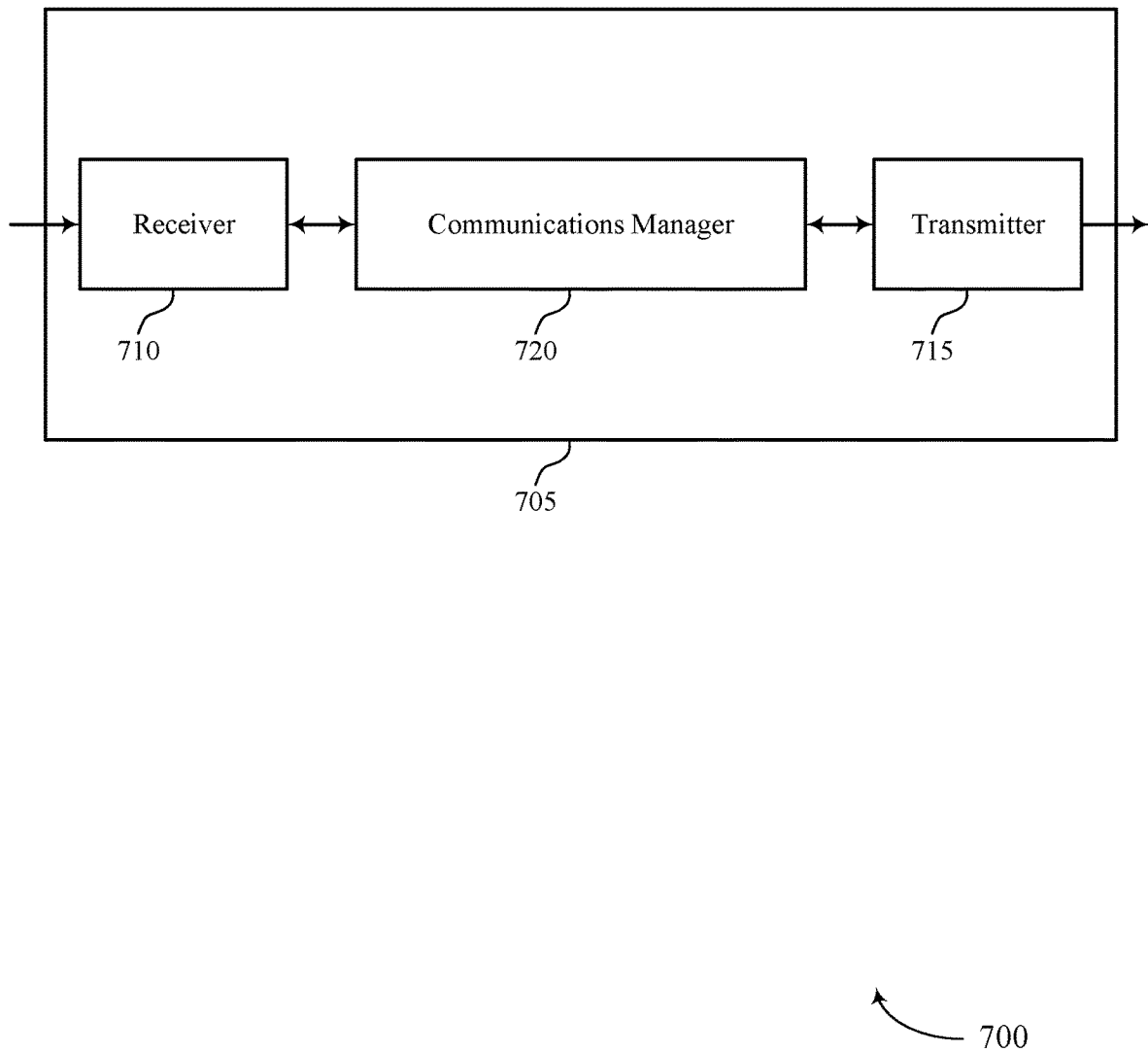
FIGS. 7 and 8 show block diagrams of devices that support dynamic beam switching delay capability in accordance with one or more aspects of the present disclosure.

FIG. 7 shows a block diagram 700 of a device 705 that supports dynamic beam switching delay capability in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic beam switching delay capability). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic beam switching delay capability). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of dynamic beam switching delay capability as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for transmitting, to a network entity and via one or more uplink messages, a set of multiple UE capability values pertaining to UE support of different beam switching delay times for selection of a reception beam at the UE, the different beam switching delay times each associated with a same type of beam switching event. The communications manager 720 may be configured as or otherwise support a means for receiving, from the network entity, a first downlink message that triggers the beam switching event. The communications manager 720 may be configured as or otherwise support a means for switching to the reception beam based on receiving the first downlink message.

Additionally, or alternatively, the communications manager 720 may support wireless communication at a UE in accordance with examples as disclosed herein. For example, the communications manager 720 may be configured as or otherwise support a means for transmitting, to a network entity and via an uplink message, a UE capability value pertaining to UE support of one or more beam switching delay times for selection of a reception beam at the UE for receiving downlink transmission after receiving a channel state information signal with repetition. The communications manager 720 may be configured as or otherwise support a means for receiving, from the network entity, the channel state information signal with repetition. The communications manager 720 may be configured as or otherwise support a means for switching to the reception beam based on receiving the channel state information signal with repetition.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reducing power consumption or latency at the UE.

Figure 8:
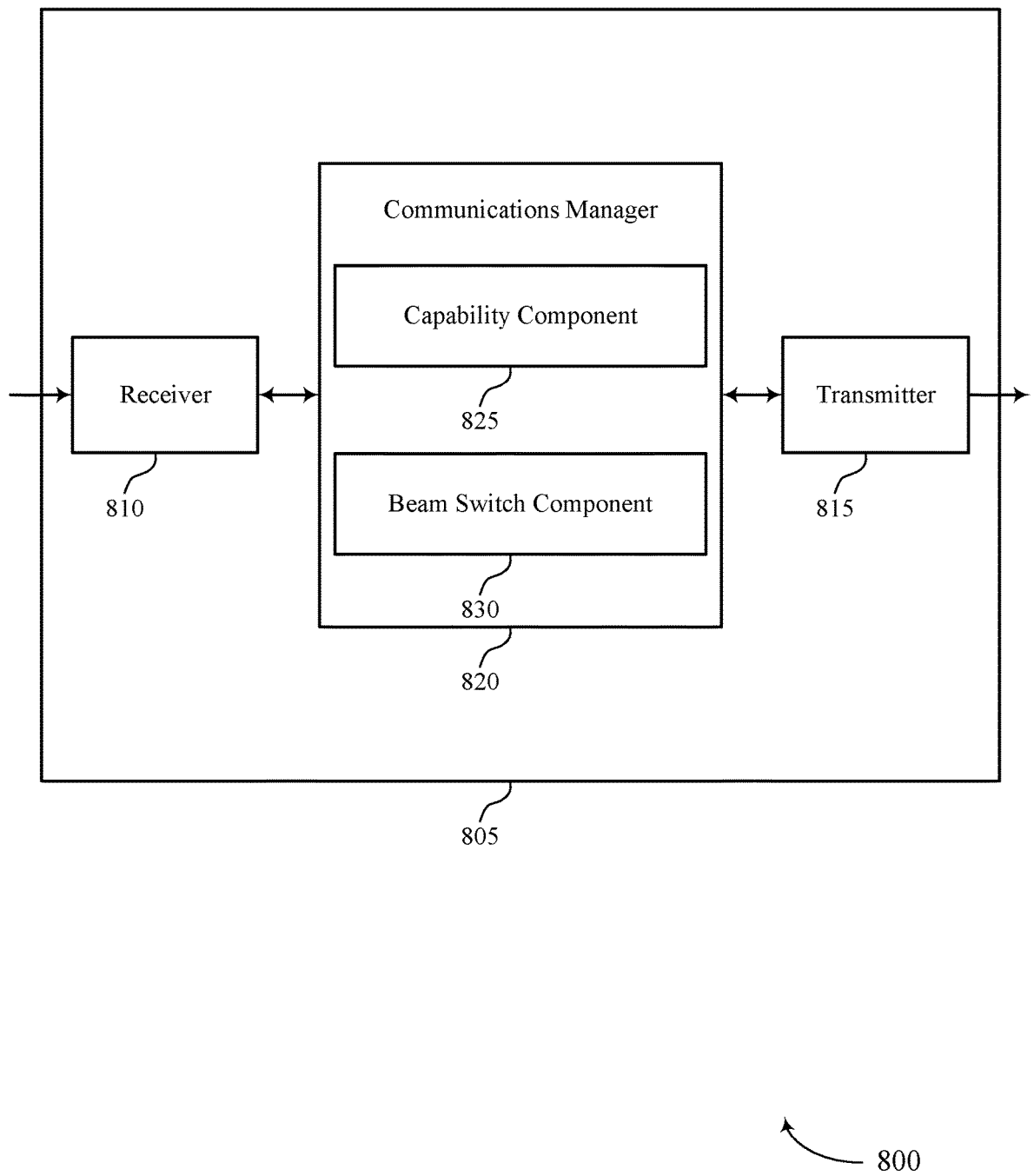

FIG. 8 shows a block diagram 800 of a device 805 that supports dynamic beam switching delay capability in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic beam switching delay capability). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic beam switching delay capability). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of dynamic beam switching delay capability as described herein. For example, the communications manager 820 may include a capability component 825, a beam switch component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The capability component 825 may be configured as or otherwise support a means for transmitting, to a network entity and via one or more uplink messages, a set of multiple UE capability values pertaining to UE support of different beam switching delay times for selection of a reception beam at the UE, the different beam switching delay times each associated with a same type of beam switching event. The beam switch component 830 may be configured as or otherwise support a means for receiving, from the network entity, a first downlink message that triggers the beam switching event. The beam switch component 830 may be configured as or otherwise support a means for switching to the reception beam based on receiving the first downlink message.

Additionally, or alternatively, the communications manager 820 may support wireless communication at a UE in accordance with examples as disclosed herein. The capability component 825 may be configured as or otherwise support a means for transmitting, to a network entity and via an uplink message, a UE capability value pertaining to UE support of one or more beam switching delay times for selection of a reception beam at the UE for receiving downlink transmission after receiving a channel state information signal with repetition. The beam switch component 830 may be configured as or otherwise support a means for receiving, from the network entity, the channel state information signal with repetition. The beam switch component 830 may be configured as or otherwise support a means for switching to the reception beam based on receiving the channel state information signal with repetition.

Figure 9:
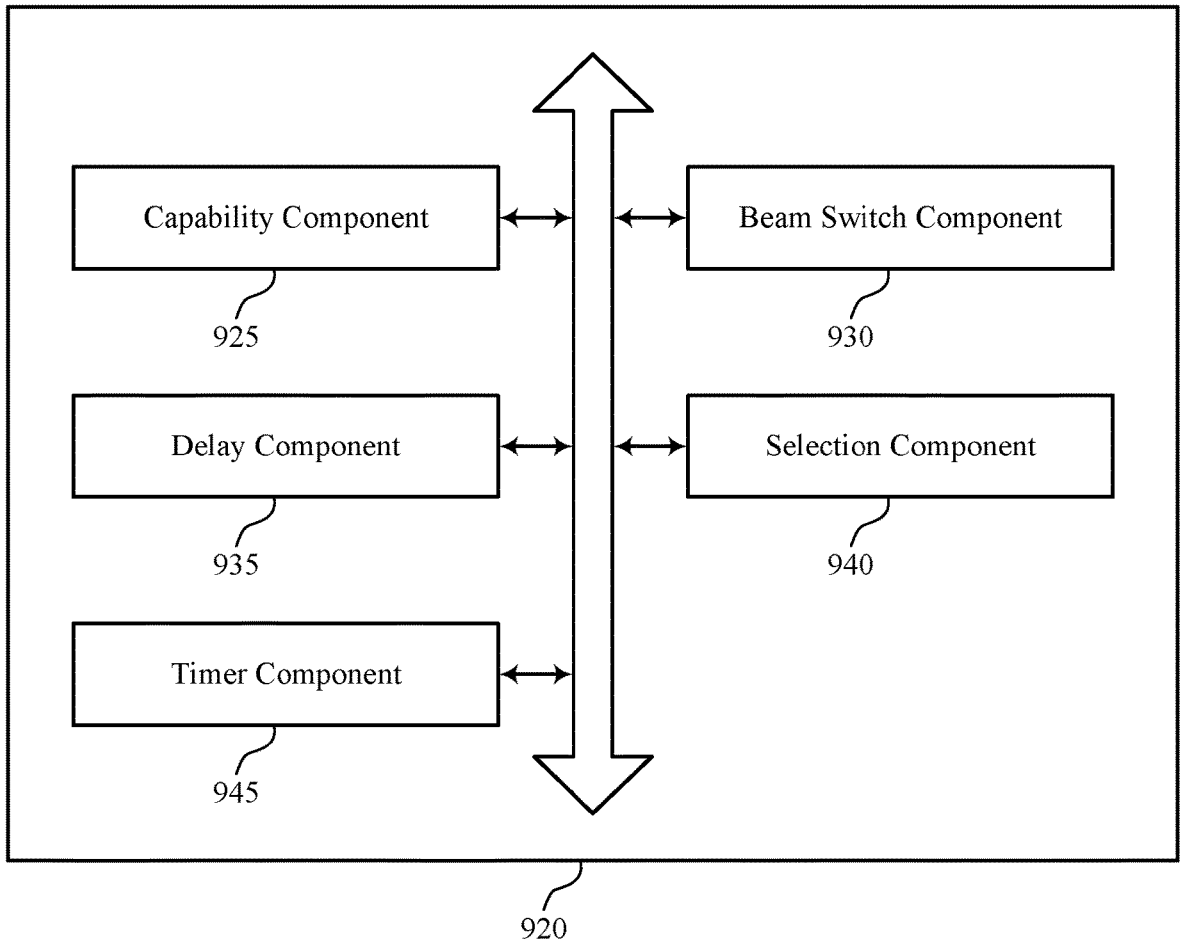
FIG. 9 shows a block diagram of a communications manager that supports dynamic beam switching delay capability in accordance with one or more aspects of the present disclosure.

FIG. 9 shows a block diagram 900 of a communications manager 920 that supports dynamic beam switching delay capability in accordance with one or more aspects of the present disclosure. The communications manager 920 may be an example of aspects of a communications manager 720, a communications manager 820, or both, as described herein. The communications manager 920, or various components thereof, may be an example of means for performing various aspects of dynamic beam switching delay capability as described herein. For example, the communications manager 920 may include a capability component 925, a beam switch component 930, a delay component 935, a selection component 940, a timer component 945, or any combination thereof. Each of these components may communicate, directly or indirectly, with one another (e.g., via one or more buses).

The communications manager 920 may support wireless communication at a UE in accordance with examples as disclosed herein. The capability component 925 may be configured as or otherwise support a means for transmitting, to a network entity and via one or more uplink messages, a set of multiple UE capability values pertaining to UE support of different beam switching delay times for selection of a reception beam at the UE, the different beam switching delay times each associated with a same type of beam switching event. The beam switch component 930 may be configured as or otherwise support a means for receiving, from the network entity, a first downlink message that triggers the beam switching event. In some examples, the beam switch component 930 may be configured as or otherwise support a means for switching to the reception beam based on receiving the first downlink message.

In some examples, the delay component 935 may be configured as or otherwise support a means for performing the beam switching event in accordance with a first beam switching delay time of the different beam switching delay times, where the beam switching event includes receiving, at a time that is the first beam switching delay time after receiving the first downlink message, a second downlink message using the selected reception beam at the UE.

In some examples, the first downlink message includes a downlink control information signal including a transmission configuration indicator information, and the second downlink message includes a physical downlink shared channel. In some examples, the first downlink message includes a downlink control information signal and the second downlink message includes an aperiodic channel state information reference signal.

In some examples, the selection component 940 may be configured as or otherwise support a means for transmitting, at a time that is the first beam switching delay time after receiving the first downlink message, an indication of the selected reception beam at the UE, where the first downlink message includes at least one of a downlink reference signal, a synchronization signal block, a channel state information reference signal, or a combination thereof.

In some examples, to support transmitting the set of multiple UE capability values, the delay component 935 may be configured as or otherwise support a means for periodically transmitting the set of multiple UE capability values pertaining to support, by the UE, of different beam switching delay times for selection of the reception beam at the UE.

In some examples, the capability component 925 may be configured as or otherwise support a means for determining a change in one or more parameters at the UE, where transmitting the set of multiple UE capability values is based on the change in the one or more parameters at the UE.

In some examples, the delay component 935 may be configured as or otherwise support a means for receiving, from the network entity, a request for a predetermined beam switching delay value, where transmitting the set of multiple UE capability values is based on receiving the request for the predetermined beam switching delay value.

In some examples, the timer component 945 may be configured as or otherwise support a means for determining an expiry of a timer, where transmitting the set of multiple UE capability values is in response to the expiry of the timer.

In some examples, the selection component 940 may be configured as or otherwise support a means for receiving a first capability selection message indicating a first beam switching delay time of the different beam switching delay times. In some examples, the delay component 935 may be configured as or otherwise support a means for communicating with the network entity in accordance with the first beam switching delay time based on receiving the first capability selection message.

In some examples, the selection component 940 may be configured as or otherwise support a means for receiving a second capability selection message indicating a second beam switching delay time of the different beam switching delay times, where the second beam switching delay time is different from the first beam switching delay time. In some examples, the delay component 935 may be configured as or otherwise support a means for communicating with the network entity in accordance with the second beam switching delay time based on receiving the second capability selection message.

In some examples, communicating with the network entity includes communicating with the network entity a predetermined time after the receiving the first capability selection message. In some examples, the set of multiple UE capability values indicates a set of multiple indices from a pre-configured table.

In some examples, the one or more uplink messages include at least one of a physical uplink shared channel, a physical uplink control channel, a random access channel, a sounding reference signal, or a combination thereof. In some examples, the uplink message includes at least one of a physical uplink shared channel, a physical uplink control channel, a random access channel, a sounding reference signal, or a combination thereof.

Additionally, or alternatively, the communications manager 920 may support wireless communication at a UE in accordance with examples as disclosed herein. In some examples, the capability component 925 may be configured as or otherwise support a means for transmitting, to a network entity and via an uplink message, a UE capability value pertaining to UE support of one or more beam switching delay times for selection of a reception beam at the UE for receiving downlink transmission after receiving a channel state information signal with repetition. In some examples, the beam switch component 930 may be configured as or otherwise support a means for receiving, from the network entity, the channel state information signal with repetition. In some examples, the beam switch component 930 may be configured as or otherwise support a means for switching to the reception beam based on receiving the channel state information signal with repetition.

In some examples, the delay component 935 may be configured as or otherwise support a means for receiving, from the network entity, a delay parameter indicating a time period after the channel state information signal. In some examples, the delay component 935 may be configured as or otherwise support a means for assuming an absence of downlink messages during the time period after receiving the channel state information signal based on the delay parameter.

In some examples, the UE capability value is based on a subcarrier spacing, a number of antenna panels at the UE, a periodicity of the channel state information signal, a slot resolution, a symbol resolution, a number of channel state information reference signal resources used in a beam training session, or a combination thereof.

Figure 10:
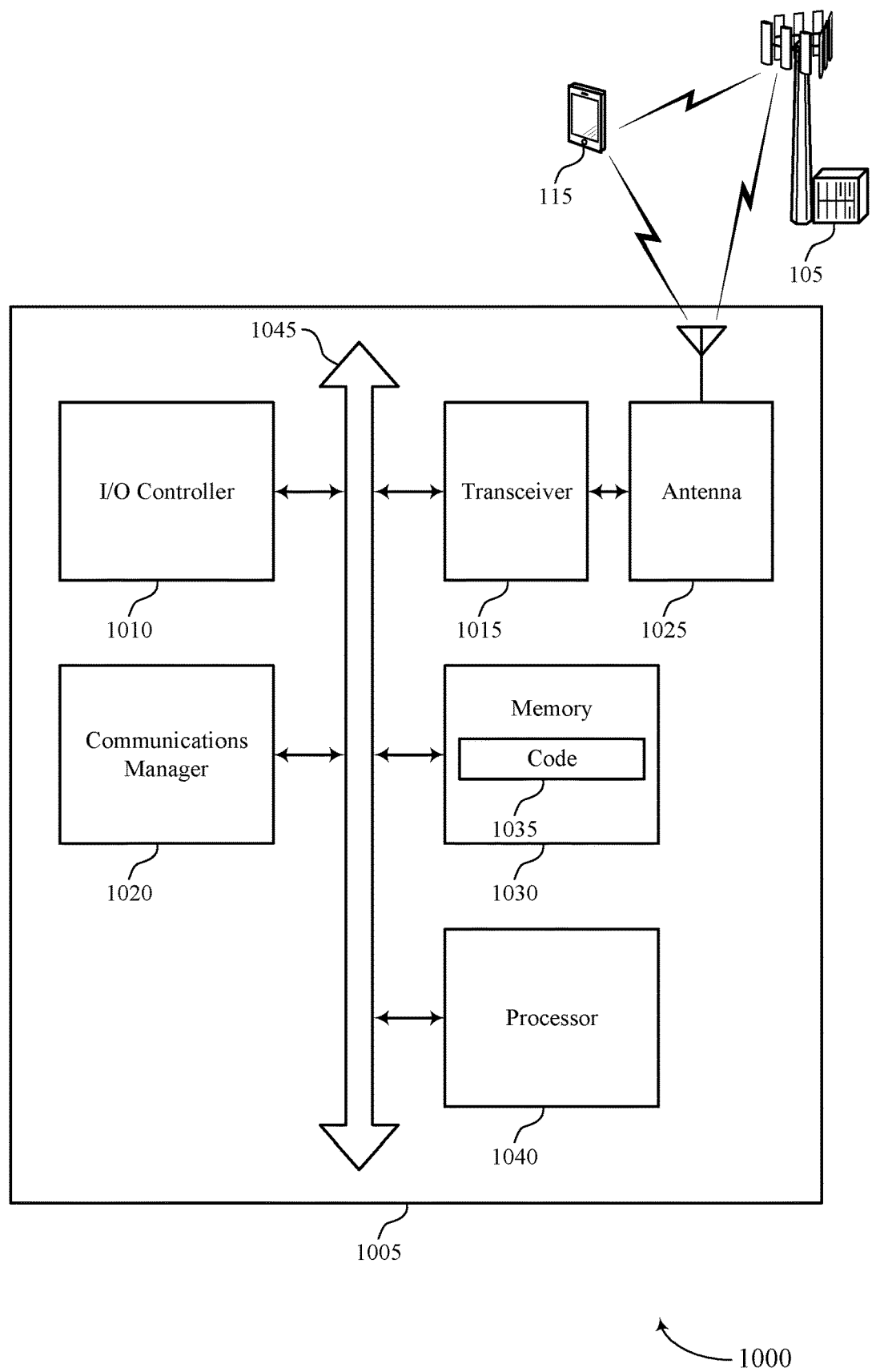
FIG. 10 shows a diagram of a system including a device that supports dynamic beam switching delay capability in accordance with one or more aspects of the present disclosure.

FIG. 10 shows a diagram of a system 1000 including a device 1005 that supports dynamic beam switching delay capability in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting dynamic beam switching delay capability). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for transmitting, to a network entity and via one or more uplink messages, a set of multiple UE capability values pertaining to UE support of different beam switching delay times for selection of a reception beam at the UE, the different beam switching delay times each associated with a same type of beam switching event. The communications manager 1020 may be configured as or otherwise support a means for receiving, from the network entity, a first downlink message that triggers the beam switching event. The communications manager 1020 may be configured as or otherwise support a means for switching to the reception beam based on receiving the first downlink message.

Additionally, or alternatively, the communications manager 1020 may support wireless communication at a UE in accordance with examples as disclosed herein. For example, the communications manager 1020 may be configured as or otherwise support a means for transmitting, to a network entity and via an uplink message, a UE capability value pertaining to UE support of one or more beam switching delay times for selection of a reception beam at the UE for receiving downlink transmission after receiving a channel state information signal with repetition. The communications manager 1020 may be configured as or otherwise support a means for receiving, from the network entity, the channel state information signal with repetition. The communications manager 1020 may be configured as or otherwise support a means for switching to the reception beam based on receiving the channel state information signal with repetition.

By including or configuring the communications manager 1020 in accordance with examples as described herein, the device 1005 may support techniques for improved communication reliability, reduced latency, reduced power consumption, improved coordination between devices, longer battery life, or a combination thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of dynamic beam switching delay capability as described herein, or the processor 1040 and the memory 1030 may be otherwise configured to perform or support such operations.

Figure 11:
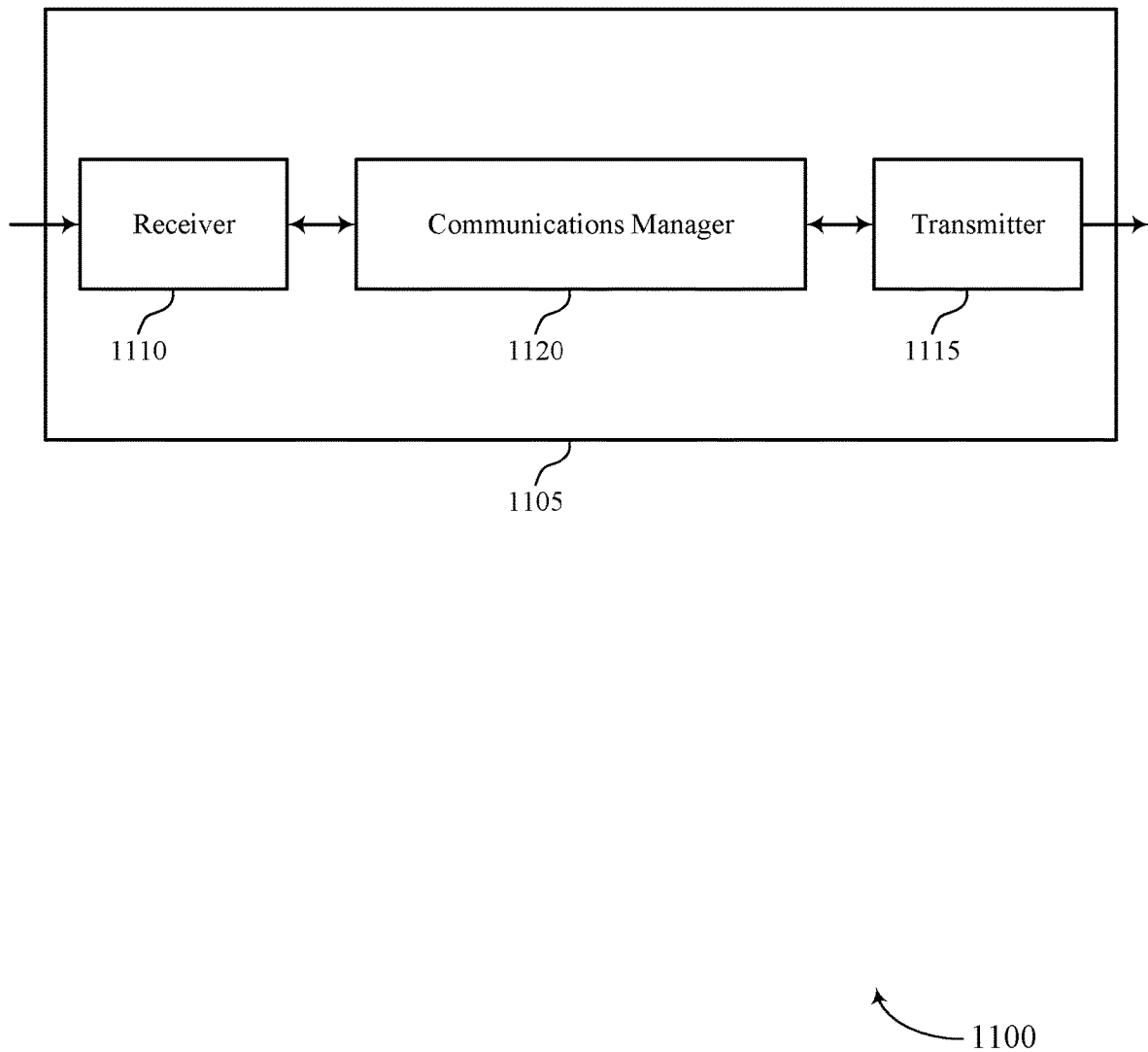
FIGS. 11 and 12 show block diagrams of devices that support dynamic beam switching delay capability in accordance with one or more aspects of the present disclosure.

FIG. 11 shows a block diagram 1100 of a device 1105 that supports dynamic beam switching delay capability in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of dynamic beam switching delay capability as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for receiving, from a UE and via one or more uplink messages, a set of multiple UE capability values pertaining to UE support of different beam switching delay times for selection of a reception beam at the UE, the different beam switching delay times each associated with a same type of beam switching event. The communications manager 1120 may be configured as or otherwise support a means for transmitting, to the UE, a first downlink message that triggers the beam switching event. The communications manager 1120 may be configured as or otherwise support a means for communicating with the UE in accordance with one of the different beam switching delay times based on transmitting the first downlink message.

Additionally, or alternatively, the communications manager 1120 may support wireless communication at a network entity in accordance with examples as disclosed herein. For example, the communications manager 1120 may be configured as or otherwise support a means for receiving, from a UE and via an uplink message, a UE capability value pertaining to UE support of one or more beam switching delay times for selection of a reception beam at the UE for receiving downlink transmission after receiving a channel state information signal with repetition. The communications manager 1120 may be configured as or otherwise support a means for transmitting, to the UE, the channel state information signal with repetition. The communications manager 1120 may be configured as or otherwise support a means for communicating with the UE in accordance with one of the one or more beam switching delay times based on transmitting the channel state information signal with repetition.

By including or configuring the communications manager 1120 in accordance with examples as described herein, the device 1105 (e.g., a processor controlling or otherwise coupled with the receiver 1110, the transmitter 1115, the communications manager 1120, or a combination thereof)

may support techniques for reduced power consumption or latency, and more efficient utilization of communication resources.

Figure 12:
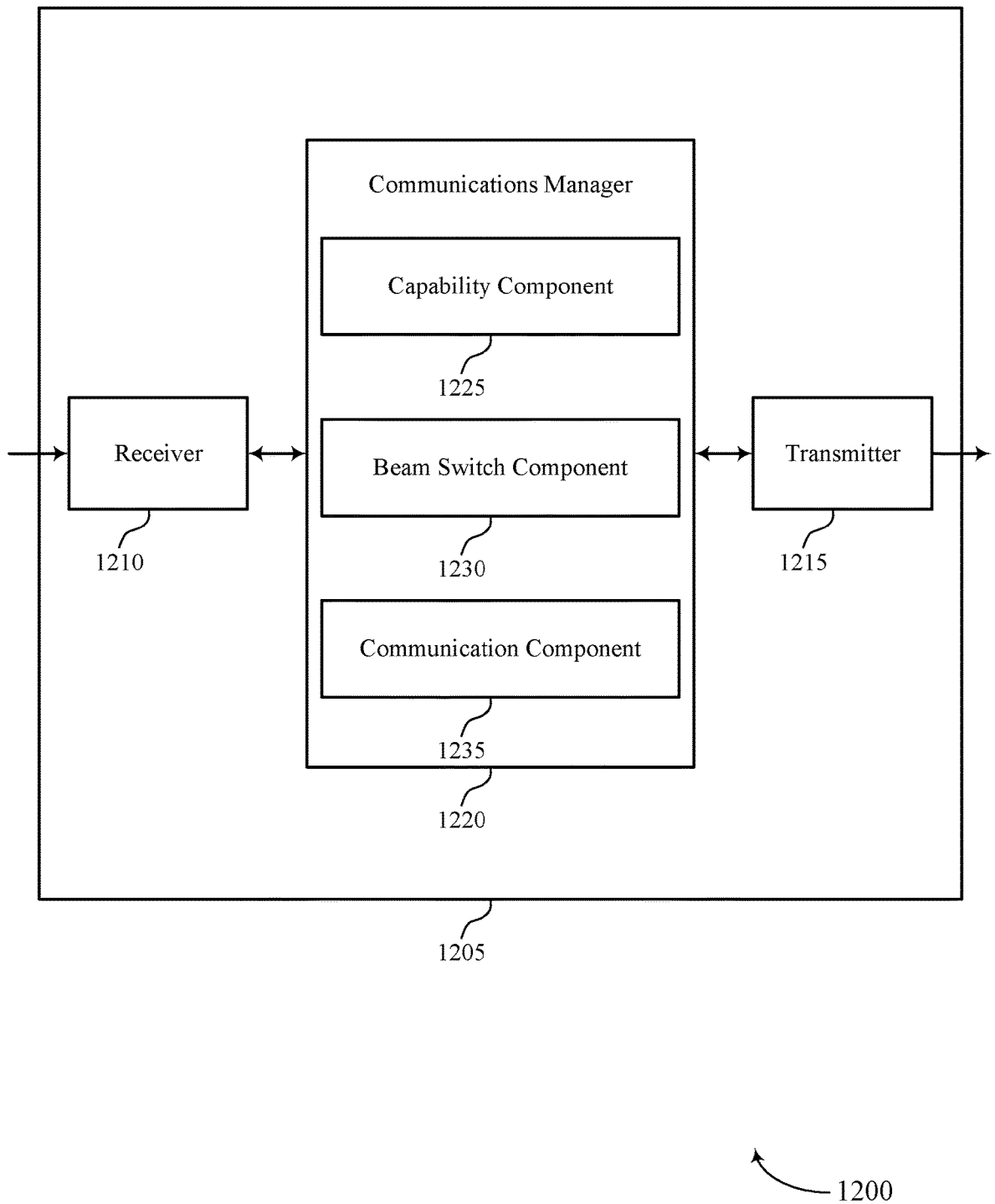

FIG. 12 shows a block diagram 1200 of a device 1205 that supports dynamic beam switching delay capability in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of dynamic beam switching delay capability as described herein. For example, the communications manager 1220 may include a capability component 1225, a beam switch component 1230, a communication component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The capability component 1225 may be configured as or otherwise support a means for receiving, from a UE and via one or more uplink messages, a set of multiple UE capability values pertaining to UE support of different beam switching delay times for selection of a reception beam at the UE, the different beam switching delay times each associated with a same type of beam switching event. The beam switch component 1230 may be configured as or otherwise support a means for transmitting, to the UE, a first downlink message that triggers the beam switching event. The beam switch component 1230 may be configured as or otherwise support a means for communicating with the UE in accordance with one of the different beam switching delay times based on transmitting the first downlink message.

Additionally, or alternatively, the communications manager 1220 may support wireless communication at a network entity in accordance with examples as disclosed herein. The capability component 1225 may be configured as or otherwise support a means for receiving, from a UE and via an uplink message, a UE capability value pertaining to UE support of one or more beam switching delay times for selection of a reception beam at the UE for receiving downlink transmission after receiving a channel state information signal with repetition. The communication component 1235 may be configured as or otherwise support a means for transmitting, to the UE, the channel state information signal with repetition. The communication component 1235 may be configured as or otherwise support a means for communicating with the UE in accordance with one of the one or more beam switching delay times based on transmitting the channel state information signal with repetition.

Figure 13:
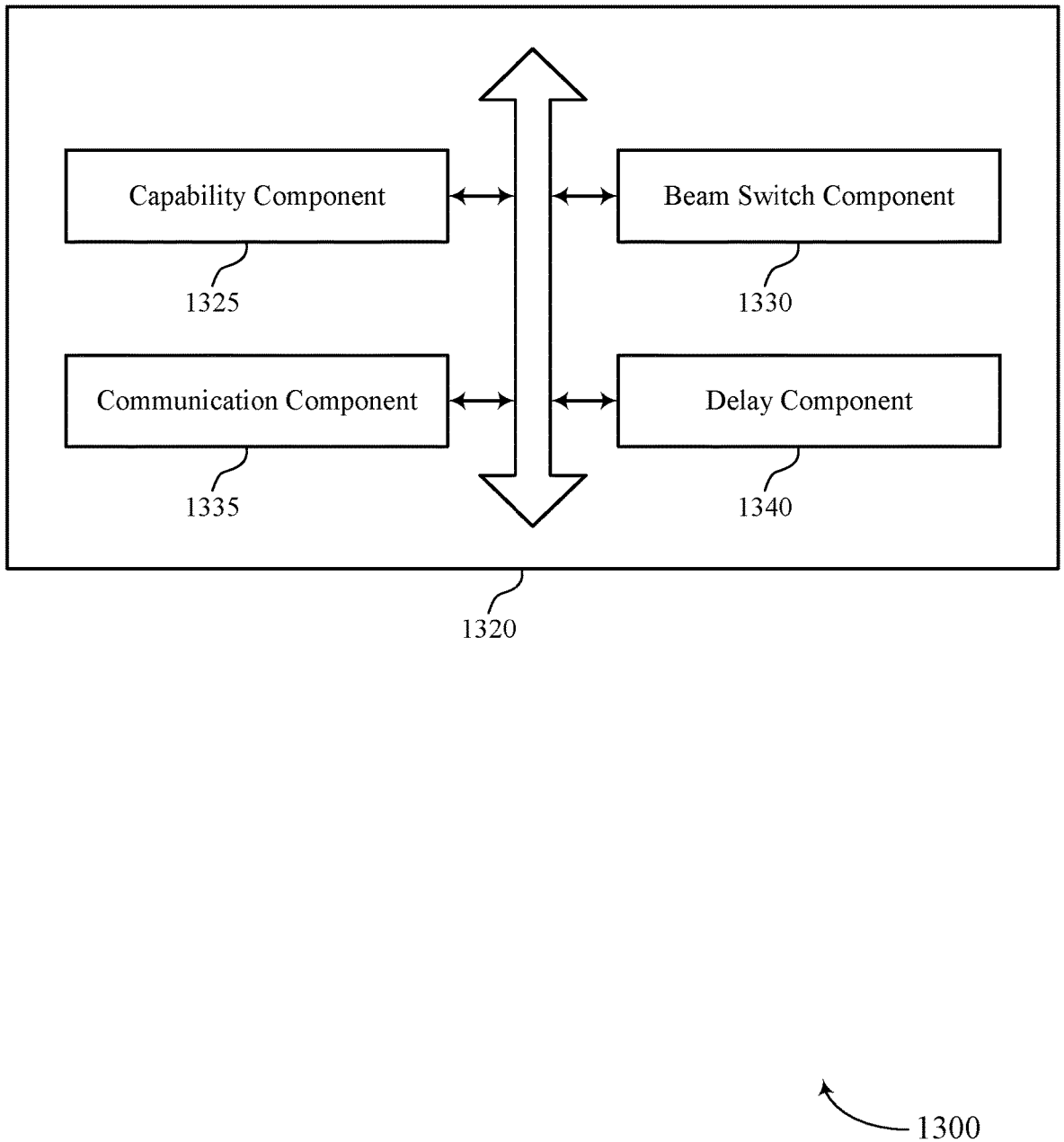
FIG. 13 shows a block diagram of a communications manager that supports dynamic beam switching delay capability in accordance with one or more aspects of the present disclosure.

FIG. 13 shows a block diagram 1300 of a communications manager 1320 that supports dynamic beam switching delay capability in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of dynamic beam switching delay capability as described herein. For example, the communications manager 1320 may include a capability component 1325, a beam switch component 1330, a communication component 1335, a delay component 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The capability component 1325 may be configured as or otherwise support a means for receiving, from a UE and via one or more uplink messages, a set of multiple UE capability values pertaining to UE support of different beam switching delay times for selection of a reception beam at the UE, the different beam switching delay times each associated with a same type of beam switching event. The beam switch component 1330 may be configured as or otherwise support a means for transmitting, to the UE, a first downlink message that triggers the beam switching event. In some examples, the beam switch component 1330 may be configured as or otherwise support a means for communicating with the UE in accordance with one of the different beam switching delay times based on transmitting the first downlink message.

In some examples, the delay component 1340 may be configured as or otherwise support a means for determining that the beam switching event is performed in accordance with a first beam switching delay time of the different beam switching delay times, where the beam switching event includes transmitting, at a time that is the first beam switching delay time after transmitting the first downlink message, a second downlink message using the selected reception beam at the UE.

In some examples, the first downlink message includes a downlink control information signal including a transmission configuration indicator information, and the second downlink message includes a physical downlink shared channel. In some examples, the first downlink message includes a downlink control information signal and the second downlink message includes an aperiodic channel state information reference signal.

In some examples, the beam switch component 1330 may be configured as or otherwise support a means for receiving, at a time that is the first beam switching delay time after transmitting the first downlink message, an indication of the selected reception beam at the UE, where the first downlink message includes at least one of a downlink reference signal, a synchronization signal block, a channel state information reference signal, or a combination thereof.

In some examples, to support receiving the set of multiple UE capability values, the delay component 1340 may be configured as or otherwise support a means for periodically receiving the set of multiple UE capability values pertaining to support, by the UE, of different beam switching delay times for selection of the reception beam at the UE.

In some examples, receiving the set of multiple UE capability values based on a change in one or more parameters at the UE or is in response to an expiry of a timer. In some examples, the delay component 1340 may be configured as or otherwise support a means for transmitting, to the UE, a request for a predetermined beam switching delay value, where receiving the set of multiple UE capability values is based on transmitting the request for the predetermined beam switching delay value.

In some examples, the capability component 1325 may be configured as or otherwise support a means for transmitting a first capability selection message indicating a first beam switching delay time of the different beam switching delay times. In some examples, the capability component 1325 may be configured as or otherwise support a means for communicating with the UE in accordance with the first beam switching delay time based on transmitting the first capability selection message.

In some examples, the capability component 1325 may be configured as or otherwise support a means for transmitting a second capability selection message indicating a second beam switching delay time of the different beam switching delay times, where the second beam switching delay time is different from the first beam switching delay time. In some examples, the communication component 1335 may be configured as or otherwise support a means for communicating with the UE in accordance with the second beam switching delay time based on transmitting the second capability selection message.

Additionally, or alternatively, the communications manager 1320 may support wireless communication at a network entity in accordance with examples as disclosed herein. In some examples, the capability component 1325 may be configured as or otherwise support a means for receiving, from a UE and via an uplink message, a UE capability value pertaining to UE support of one or more beam switching delay times for selection of a reception beam at the UE for receiving downlink transmission after receiving a channel state information signal with repetition. The communication component 1335 may be configured as or otherwise support a means for transmitting, to the UE, the channel state information signal with repetition. In some examples, the communication component 1335 may be configured as or otherwise support a means for communicating with the UE in accordance with one of the one or more beam switching delay times based on transmitting the channel state information signal with repetition.

In some examples, the UE capability value is based on a subcarrier spacing, a number of antenna panels at the UE, a periodicity of the channel state information signal, a slot resolution, a symbol resolution, a number of channel state information reference signal resources used in a beam training session, or a combination thereof.

Figure 14:
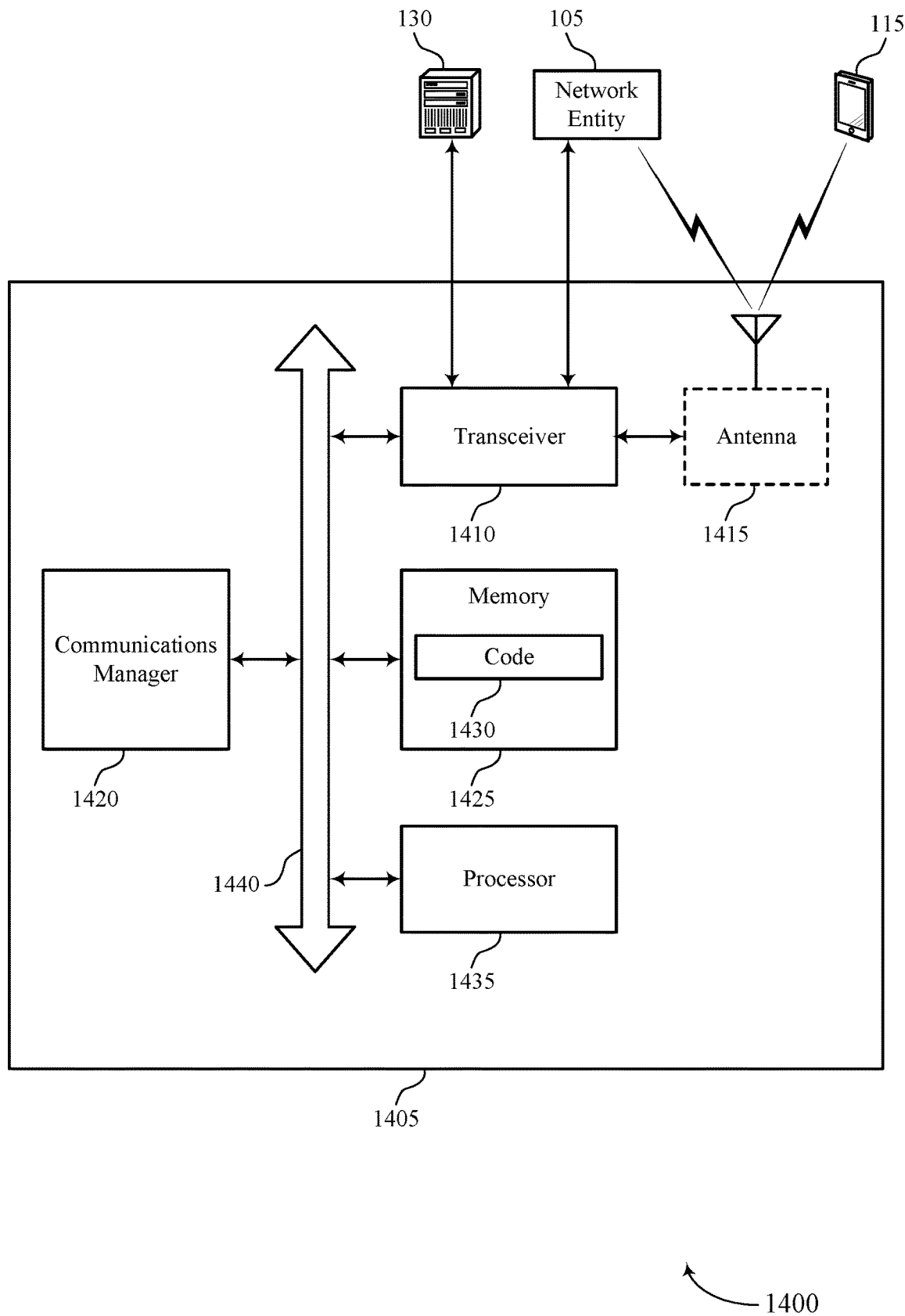
FIG. 14 shows a diagram of a system including a device that supports dynamic beam switching delay capability in accordance with one or more aspects of the present disclosure.

FIG. 14 shows a diagram of a system 1400 including a device 1405 that supports dynamic beam switching delay capability in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting dynamic beam switching delay capability). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for receiving, from a UE and via one or more uplink messages, a set of multiple UE capability values pertaining to UE support of different beam switching delay times for selection of a reception beam at the UE, the different beam switching delay times each associated with a same type of beam switching event. The communications manager 1420 may be configured as or otherwise support a means for transmitting, to the UE, a first downlink message that triggers the beam switching event. The communications manager 1420 may be configured as or otherwise support a means for communicating with the UE in accordance with one of the different beam switching delay times based on transmitting the first downlink message.

Additionally, or alternatively, the communications manager 1420 may support wireless communication at a network entity in accordance with examples as disclosed herein. For example, the communications manager 1420 may be configured as or otherwise support a means for receiving, from a UE and via an uplink message, a UE capability value pertaining to UE support of one or more beam switching delay times for selection of a reception beam at the UE for receiving downlink transmission after receiving a channel state information signal with repetition. The communications manager 1420 may be configured as or otherwise support a means for transmitting, to the UE, the channel state information signal with repetition. The communications manager 1420 may be configured as or otherwise support a means for communicating with the UE in accordance with one of the one or more beam switching delay times based on transmitting the channel state information signal with repetition.

By including or configuring the communications manager 1420 in accordance with examples as described herein, the device 1405 may support techniques for improved communication reliability, reduced latency, reduced power consumption, improved coordination between devices, longer battery life, or a combination thereof.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of dynamic beam switching delay capability as described herein, or the processor 1435 and the memory 1425 may be otherwise configured to perform or support such operations.

Figure 15:
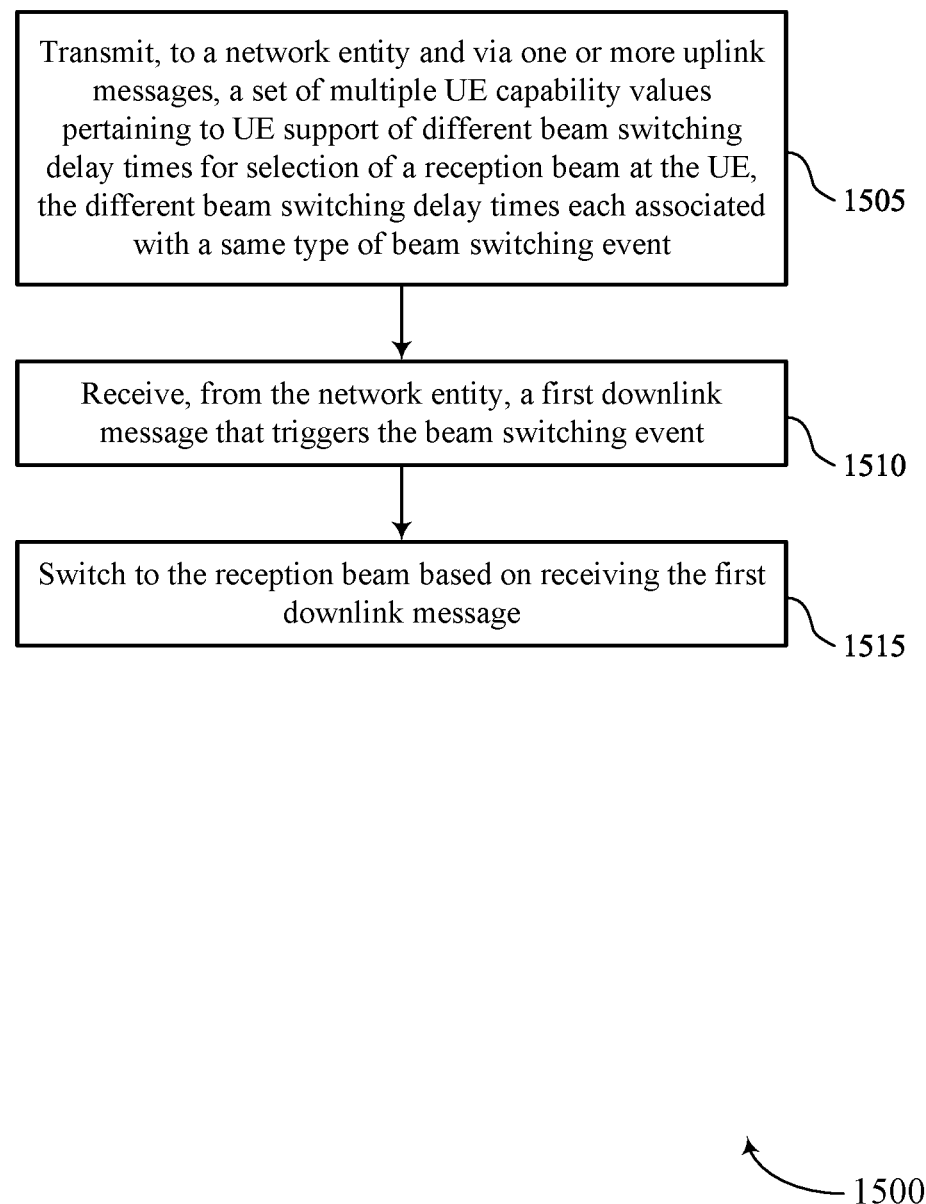
FIGS. 15 through 18 show flowcharts illustrating methods that support dynamic beam switching delay capability in accordance with one or more aspects of the present disclosure.

FIG. 15 shows a flowchart illustrating a method 1500 that supports dynamic beam switching delay capability in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity and via one or more uplink messages, a set of multiple UE capability values pertaining to UE support of different beam switching delay times for selection of a reception beam at the UE, the different beam switching delay times each associated with a same type of beam switching event. The operations of 1505 may be performed in accordance with examples as disclosed herein. In some examples, aspects of the operations of 1505 may be performed by a capability component 925 as described with reference to FIG. 9.

At 1510, the method may include receiving, from the network entity, a first downlink message that triggers the beam switching event. The operations of 1510 may be performed in accordance with examples as disclosed herein. In some examples, aspects of the operations of 1510 may be performed by a beam switch component 930 as described with reference to FIG. 9.

At 1515, the method may include switching to the reception beam based on receiving the first downlink message. The operations of 1515 may be performed in accordance with examples as disclosed herein. In some examples, aspects of the operations of 1515 may be performed by a beam switch component 930 as described with reference to FIG. 9.

Figure 16:
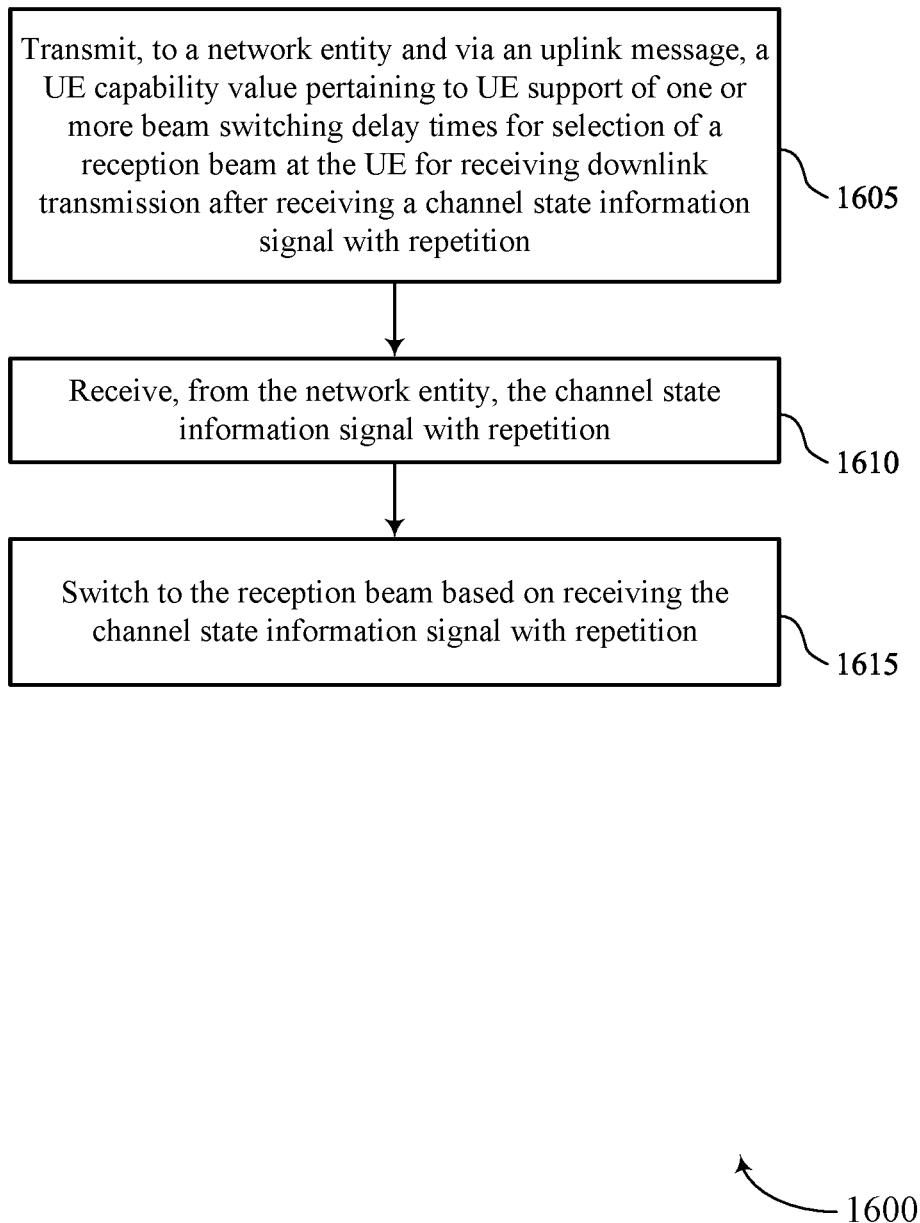

FIG. 16 shows a flowchart illustrating a method 1600 that supports dynamic beam switching delay capability in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity and via an uplink message, a UE capability value pertaining to UE support of one or more beam switching delay times for selection of a reception beam at the UE for receiving downlink transmission after receiving a channel state information signal with repetition. The operations of 1605 may be performed in accordance with examples as disclosed herein. In some examples, aspects of the operations of 1605 may be performed by a capability component 925 as described with reference to FIG. 9.

At 1610, the method may include receiving, from the network entity, the channel state information signal with repetition. The operations of 1610 may be performed in accordance with examples as disclosed herein. In some examples, aspects of the operations of 1610 may be performed by a beam switch component 930 as described with reference to FIG. 9.

At 1615, the method may include switching to the reception beam based on receiving the channel state information signal with repetition. The operations of 1615 may be performed in accordance with examples as disclosed herein. In some examples, aspects of the operations of 1615 may be performed by a beam switch component 930 as described with reference to FIG. 9.

Figure 17:
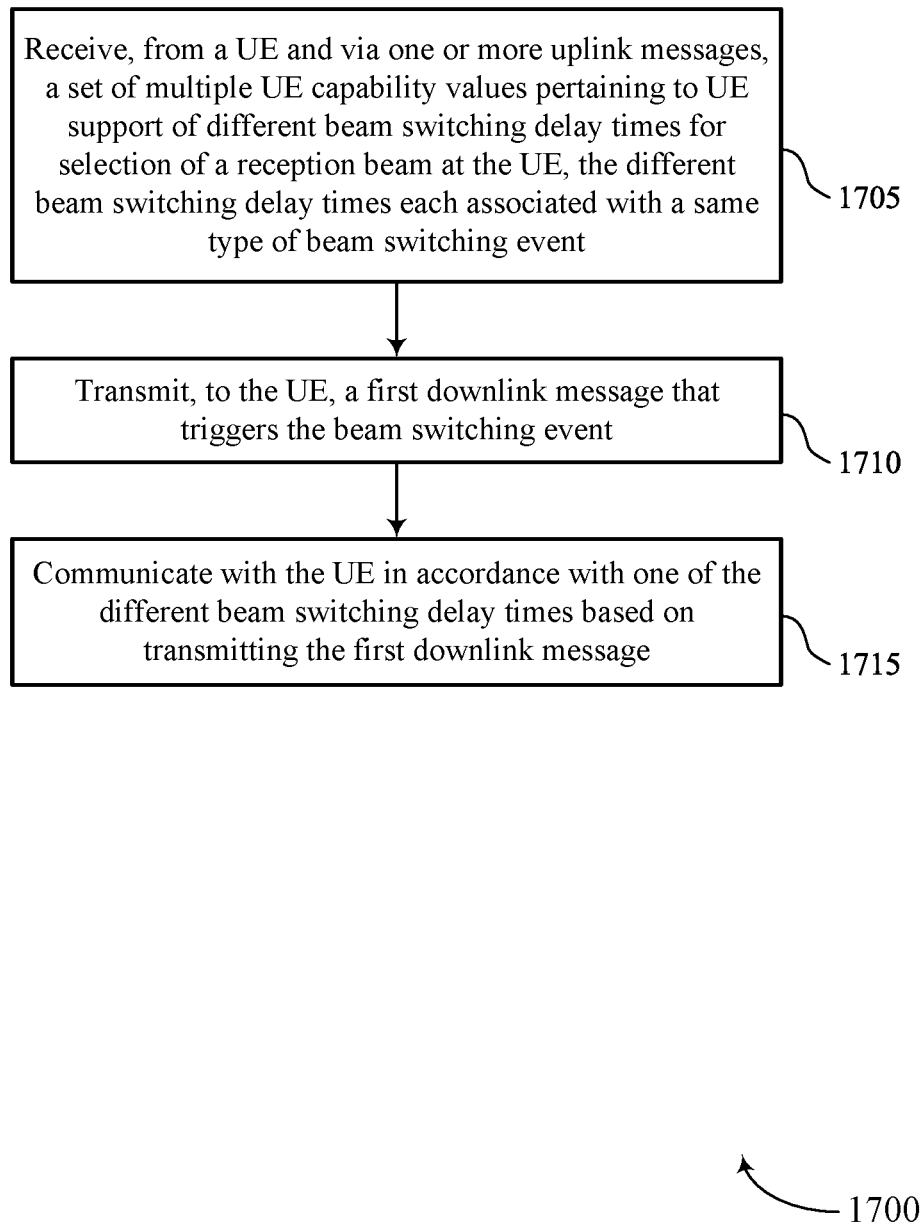

FIG. 17 shows a flowchart illustrating a method 1700 that supports dynamic beam switching delay capability in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE and via one or more uplink messages, a set of multiple UE capability values pertaining to UE support of different beam switching delay times for selection of a reception beam at the UE, the different beam switching delay times each associated with a same type of beam switching event. The operations of 1705 may be performed in accordance with examples as disclosed herein. In some examples, aspects of the operations of 1705 may be performed by a capability component 1325 as described with reference to FIG. 13.

At 1710, the method may include transmitting, to the UE, a first downlink message that triggers the beam switching event. The operations of 1710 may be performed in accordance with examples as disclosed herein. In some examples, aspects of the operations of 1710 may be performed by a beam switch component 1330 as described with reference to FIG. 13.

At 1715, the method may include communicating with the UE in accordance with one of the different beam switching delay times based on transmitting the first downlink message. The operations of 1715 may be performed in accordance with examples as disclosed herein. In some examples, aspects of the operations of 1715 may be performed by a beam switch component 1330 as described with reference to FIG. 13.

Figure 18:
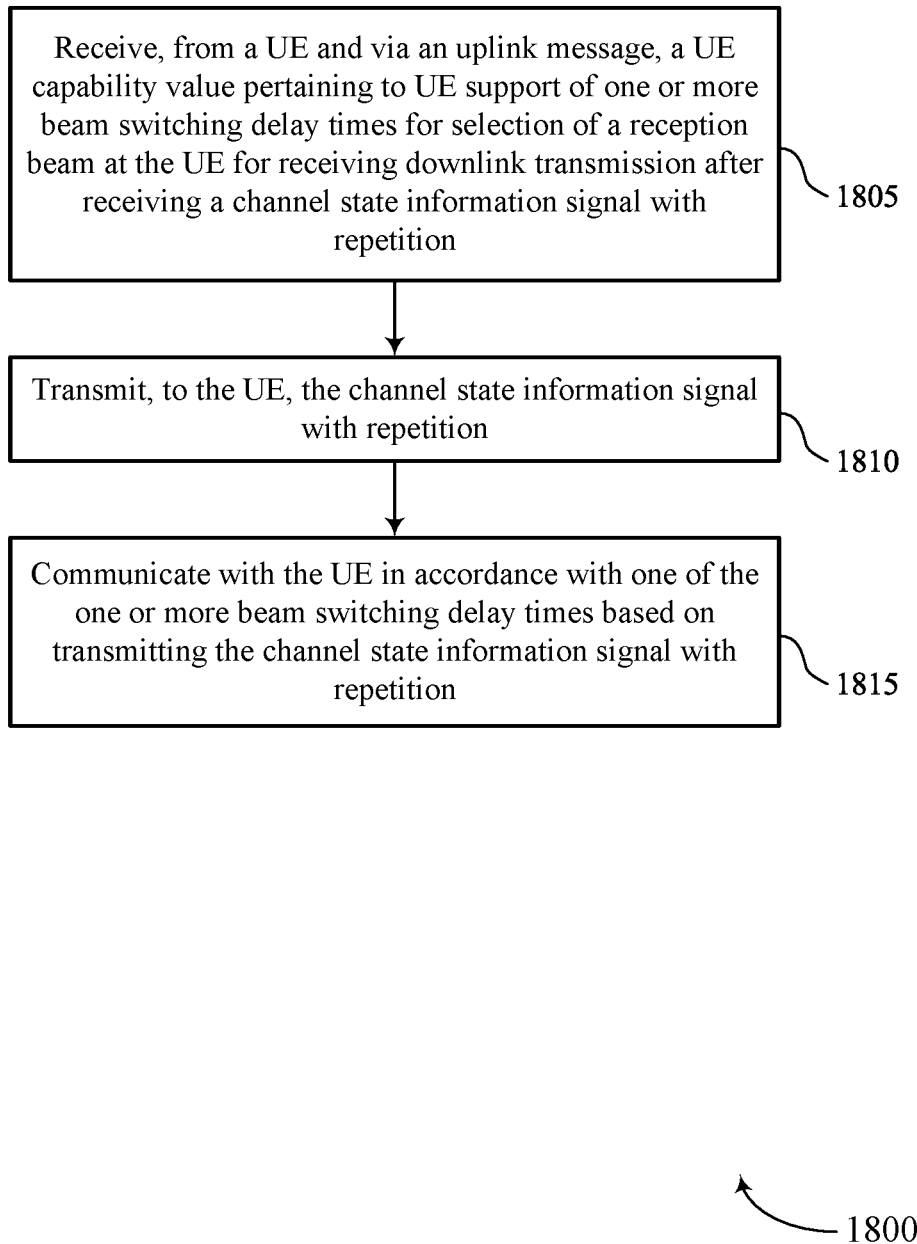

FIG. 18 shows a flowchart illustrating a method 1800 that supports dynamic beam switching delay capability in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a UE and via an uplink message, a UE capability value pertaining to UE support of one or more beam switching delay times for selection of a reception beam at the UE for receiving downlink transmission after receiving a channel state information signal with repetition. The operations of 1805 may be performed in accordance with examples as disclosed herein. In some examples, aspects of the operations of 1805 may be performed by a capability component 1325 as described with reference to FIG. 13.

At 1810, the method may include transmitting, to the UE, the channel state information signal with repetition. The operations of 1810 may be performed in accordance with examples as disclosed herein. In some examples, aspects of the operations of 1810 may be performed by a communication component 1335 as described with reference to FIG. 13.

At 1815, the method may include communicating with the UE in accordance with one of the one or more beam switching delay times based on transmitting the channel state information signal with repetition. The operations of 1815 may be performed in accordance with examples as disclosed herein. In some examples, aspects of the operations of 1815 may be performed by a communication component 1335 as described with reference to FIG. 13.

The following provides an overview of aspects of the present disclosure:

Aspect 1: A method for wireless communication at a UE, comprising: transmitting, to a network entity and via one or more uplink messages, a plurality of UE capability values pertaining to UE support of different beam switching delay times for selection of a reception beam at the UE, the different beam switching delay times each associated with a same type of beam switching event; receiving, from the network entity, a first downlink message that triggers the beam switching event; and switching to the reception beam based at least in part on receiving the first downlink message.

Aspect 2: The method of aspect 1, further comprising: performing the beam switching event in accordance with a first beam switching delay time of the different beam switching delay times, wherein the beam switching event comprises receiving, at a time that is the first beam switching delay time after receiving the first downlink message, a second downlink message using the selected reception beam at the UE.

Aspect 3: The method of aspect 2, wherein the first downlink message comprises a downlink control information signal comprising a transmission configuration indicator information, and the second downlink message comprises a physical downlink shared channel.

Aspect 4: The method of any of aspects 2 through 3, wherein the first downlink message comprises a downlink control information signal and the second downlink message comprises an aperiodic channel state information reference signal.

Aspect 5: The method of any of aspects 1 through 4, further comprising: transmitting, at a time that is the first beam switching delay time after receiving the first downlink message, an indication of the selected reception beam at the UE, wherein the first downlink message comprises at least one of a downlink reference signal, a synchronization signal block, a channel state information reference signal, or a combination thereof Aspect 6: The method of any of aspects 1 through 5, wherein transmitting the plurality of UE capability values comprises: periodically transmitting the plurality of UE capability values pertaining to support, by the UE, of different beam switching delay times for selection of the reception beam at the UE.

Aspect 7: The method of any of aspects 1 through 6, further comprising: determining a change in one or more parameters at the UE, wherein transmitting the plurality of UE capability values is based at least in part on the change in the one or more parameters at the UE.

Aspect 8: The method of any of aspects 1 through 7, further comprising: receiving, from the network entity, a request for a predetermined beam switching delay value, wherein transmitting the plurality of UE capability values is based at least in part on receiving the request for the predetermined beam switching delay value.

Aspect 9: The method of any of aspects 1 through 8, further comprising: determining an expiry of a timer, wherein transmitting the plurality of UE capability values is in response to the expiry of the timer.

Aspect 10: The method of any of aspects 1 through 9, further comprising: receiving a first capability selection message indicating a first beam switching delay time of the different beam switching delay times; and communicating with the network entity in accordance with the first beam switching delay time based at least in part on receiving the first capability selection message.

Aspect 11: The method of aspect 10, further comprising: receiving a second capability selection message indicating a second beam switching delay time of the different beam switching delay times, wherein the second beam switching delay time is different from the first beam switching delay time; and communicating with the network entity in accordance with the second beam switching delay time based at least in part on receiving the second capability selection message.

Aspect 12: The method of any of aspects 10 through 11, wherein communicating with the network entity comprises communicating with the network entity a predetermined time after the receiving the first capability selection message.

Aspect 13: The method of any of aspects 1 through 12, wherein the plurality of UE capability values indicates a plurality of indices from a pre-configured table.

Aspect 14: The method of any of aspects 1 through 13, wherein the one or more uplink messages comprise at least one of a physical uplink shared channel, a physical uplink control channel, a random access channel, a sounding reference signal, or a combination thereof Aspect 15: The method of any of aspects 1 through 14, wherein the uplink message comprises at least one of a physical uplink shared channel, a physical uplink control channel, a random access channel, a sounding reference signal, or a combination thereof Aspect 16: A method for wireless communication at a UE, comprising: transmitting, to a network entity and via an uplink message, a UE capability value pertaining to UE support of one or more beam switching delay times for selection of a reception beam at the UE for receiving downlink transmission after receiving a channel state information signal with repetition; receiving, from the network entity, the channel state information signal with repetition; and switching to the reception beam based at least in part on receiving the channel state information signal with repetition.

Aspect 17: The method of aspect 16, further comprising: receiving, from the network entity, a delay parameter indicating a time period after the channel state information signal; and assuming an absence of downlink messages during the time period after receiving the channel state information signal based at least in part on the delay parameter.

Aspect 18: The method of any of aspects 16 through 17, wherein the UE capability value is based at least in part on a subcarrier spacing, a number of antenna panels at the UE, a periodicity of the channel state information signal, a slot resolution, a symbol resolution, a number of channel state information reference signal resources used in a beam training session, or a combination thereof Aspect 19: A method for wireless communication at a network entity, comprising: receiving, from a UE and via one or more uplink messages, a plurality of UE capability values pertaining to UE support of different beam switching delay times for selection of a reception beam at the UE, the different beam switching delay times each associated with a same type of beam switching event; transmitting, to the UE, a first downlink message that triggers the beam switching event; and communicating with the UE in accordance with one of the different beam switching delay times based at least in part on transmitting the first downlink message.

Aspect 20: The method of aspect 19, further comprising: determining that the beam switching event is performed in accordance with a first beam switching delay time of the different beam switching delay times, wherein the beam switching event comprises transmitting, at a time that is the first beam switching delay time after transmitting the first downlink message, a second downlink message using the selected reception beam at the UE.

Aspect 21: The method of aspect 20, wherein the first downlink message comprises a downlink control information signal comprising a transmission configuration indicator information, and the second downlink message comprises a physical downlink shared channel.

Aspect 22: The method of any of aspects 20 through 21, wherein the first downlink message comprises a downlink control information signal and the second downlink message comprises an aperiodic channel state information reference signal.

Aspect 23: The method of any of aspects 19 through 22, further comprising: receiving, at a time that is the first beam switching delay time after transmitting the first downlink message, an indication of the selected reception beam at the UE, wherein the first downlink message comprises at least one of a downlink reference signal, a synchronization signal block, a channel state information reference signal, or a combination thereof Aspect 24: The method of any of aspects 19 through 23, wherein receiving the plurality of UE capability values comprises: periodically receiving the plurality of UE capability values pertaining to support, by the UE, of different beam switching delay times for selection of the reception beam at the UE.

Aspect 25: The method of any of aspects 19 through 24, wherein receiving the plurality of UE capability values based at least in part on a change in one or more parameters at the UE or is in response to an expiry of a timer.

Aspect 26: The method of any of aspects 19 through 25, further comprising: transmitting, to the UE, a request for a predetermined beam switching delay value, wherein receiving the plurality of UE capability values is based at least in part on transmitting the request for the predetermined beam switching delay value.

Aspect 27: The method of any of aspects 19 through 26, further comprising: transmitting a first capability selection message indicating a first beam switching delay time of the different beam switching delay times; and communicating with the UE in accordance with the first beam switching delay time based at least in part on transmitting the first capability selection message.

Aspect 28: The method of aspect 27, further comprising: transmitting a second capability selection message indicating a second beam switching delay time of the different beam switching delay times, wherein the second beam switching delay time is different from the first beam switching delay time; and communicating with the UE in accordance with the second beam switching delay time based at least in part on transmitting the second capability selection message.

Aspect 29: A method for wireless communication at a network entity, comprising: receiving, from a UE and via an uplink message, a UE capability value pertaining to UE support of one or more beam switching delay times for selection of a reception beam at the UE for receiving downlink transmission after receiving a channel state information signal with repetition; transmitting, to the UE, the channel state information signal with repetition; and communicating with the UE in accordance with one of the one or more beam switching delay times based at least in part on transmitting the channel state information signal with repetition.

Aspect 30: The method of aspect 29, wherein the UE capability value is based at least in part on a subcarrier spacing, a number of antenna panels at the UE, a periodicity of the channel state information signal, a slot resolution, a symbol resolution, a number of channel state information reference signal resources used in a beam training session, or a combination thereof Aspect 31: An apparatus for wireless communication at a UE, comprising a processor; memory coupled with the processor; and instructions stored in the memory and executable by the processor to cause the apparatus to perform a method of any of aspects 1 through 15.

Aspect 32: An apparatus for wireless communication at a UE, comprising at least one means for performing a method of any of aspects 1 through 15.

Aspect 33: A non-transitory computer-readable medium storing code for wireless communication at a UE, the code comprising instructions executable by a processor to perform a method of any of aspects 1 through 15.

Aspect 34: An apparatus for wireless communication at a UE, comprising a processor; memory coupled with the processor; and instructions stored in the memory and executable by the processor to cause the apparatus to perform a method of any of aspects 16 through 18.

Aspect 35: An apparatus for wireless communication at a UE, comprising at least one means for performing a method of any of aspects 16 through 18.

Aspect 36: A non-transitory computer-readable medium storing code for wireless communication at a UE, the code comprising instructions executable by a processor to perform a method of any of aspects 16 through 18.

Aspect 37: An apparatus for wireless communication at a network entity, comprising a processor; memory coupled with the processor; and instructions stored in the memory and executable by the processor to cause the apparatus to perform a method of any of aspects 19 through 28.

Aspect 38: An apparatus for wireless communication at a network entity, comprising at least one means for performing a method of any of aspects 19 through 28.

Aspect 39: A non-transitory computer-readable medium storing code for wireless communication at a network entity, the code comprising instructions executable by a processor to perform a method of any of aspects 19 through 28.

Aspect 40: An apparatus for wireless communication at a network entity, comprising a processor; memory coupled with the processor; and instructions stored in the memory and executable by the processor to cause the apparatus to perform a method of any of aspects 29 through 30.

Aspect 41: An apparatus for wireless communication at a network entity, comprising at least one means for performing a method of any of aspects 29 through 30.

Aspect 42: A non-transitory computer-readable medium storing code for wireless communication at a network entity, the code comprising instructions executable by a processor to perform a method of any of aspects 29 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
transmitting, to a network entity and via one or more uplink messages, a plurality of UE capability values, each UE capability value of the plurality of UE capability values pertaining to UE support of a respective beam switching delay time of a plurality of different beam switching delay times for selection of a reception beam at the UE, the plurality of different beam switching delay times each associated with a same type of beam switching event;
receiving, from the network entity, a first downlink message that triggers the beam switching event; and
switching to the reception beam in accordance with a first beam switching delay time of the plurality of different beam switching delay times based at least in part on receiving the first downlink message.

2. The method of claim 1, wherein the beam switching event comprises receiving, at a time that is the first beam switching delay time after receiving the first downlink message, a second downlink message using the selected reception beam at the UE.

3. The method of claim 2, wherein the first downlink message comprises a downlink control information signal comprising a transmission configuration indicator information, and the second downlink message comprises a physical downlink shared channel.

4. The method of claim 2, wherein the first downlink message comprises a downlink control information signal and the second downlink message comprises an aperiodic channel state information reference signal.

5. The method of claim 1, further comprising:
transmitting, at a time that is the first beam switching delay time after receiving the first downlink message, an indication of the selected reception beam at the UE, wherein the first downlink message comprises at least one of a downlink reference signal, a synchronization signal block, a channel state information reference signal, or a combination thereof.

6. The method of claim 1, wherein transmitting the plurality of UE capability values comprises:
periodically transmitting the plurality of UE capability values pertaining to support, by the UE, of different beam switching delay times for selection of the reception beam at the UE.

7. The method of claim 1, further comprising:
determining a change in one or more parameters at the UE, wherein transmitting the plurality of UE capability values is based at least in part on the change in the one or more parameters at the UE.

8. The method of claim 1, further comprising:
receiving, from the network entity, a request for a predetermined beam switching delay value, wherein transmitting the plurality of UE capability values is based at least in part on receiving the request for the predetermined beam switching delay value.

9. The method of claim 1, further comprising:
determining an expiry of a timer, wherein transmitting the plurality of UE capability values is in response to the expiry of the timer.

10. The method of claim 1, further comprising:
receiving a first capability selection message indicating the first beam switching delay time of the plurality of different beam switching delay times; and
communicating with the network entity in accordance with the first beam switching delay time based at least in part on receiving the first capability selection message.

11. The method of claim 10, further comprising:
receiving a second capability selection message indicating a second beam switching delay time of the plurality of different beam switching delay times, wherein the second beam switching delay time is different from the first beam switching delay time; and
communicating with the network entity in accordance with the second beam switching delay time based at least in part on receiving the second capability selection message.

12. The method of claim 10, wherein communicating with the network entity comprises communicating with network entity a predetermined time after the receiving the first capability selection message.

13. The method of claim 1, wherein the plurality of UE capability values indicates a plurality of indices from a pre-configured table.

14. The method of claim 1, wherein the one or more uplink messages comprise at least one of a physical uplink shared channel, a physical uplink control channel, a random access channel, a sounding reference signal, or a combination thereof.

15. A method for wireless communication at a network entity, comprising:
receiving, from a user equipment (UE) and via one or more uplink messages, a plurality of UE capability values, each UE capability value of the plurality of UE capability values pertaining to UE support of a respective beam switching delay time of a plurality of different beam switching delay times for selection of a reception beam at the UE, the plurality of different beam switching delay times each associated with a same type of beam switching event;
transmitting, to the UE, a first downlink message that triggers the beam switching event; and
communicating with the UE in accordance with a first beam switching delay time of the plurality of different beam switching delay times based at least in part on transmitting the first downlink message.

16. The method of claim 15, further comprising:
determining that the beam switching event is performed in accordance with the first beam switching delay time of the plurality of different beam switching delay times, wherein the beam switching event comprises transmitting, at a time that is the first beam switching delay time after transmitting the first downlink message, a second downlink message using the selected reception beam at the UE.

17. The method of claim 16, wherein the first downlink message comprises a downlink control information signal comprising a transmission configuration indicator information, and the second downlink message comprises a physical downlink shared channel.

18. The method of claim 16, wherein the first downlink message comprises a downlink control information signal and the second downlink message comprises an aperiodic channel state information reference signal.

19. The method of claim 15, further comprising:
receiving, at a time that is the first beam switching delay time after transmitting the first downlink message, an indication of the selected reception beam at the UE, wherein the first downlink message comprises at least one of a downlink reference signal, a synchronization signal block, a channel state information reference signal, or a combination thereof.

20. The method of claim 15, wherein receiving the plurality of UE capability values comprises:
periodically receiving the plurality of UE capability values pertaining to support, by the UE, of different beam switching delay times for selection of the reception beam at the UE.

21. The method of claim 15, wherein receiving the plurality of UE capability values based at least in part on a change in one or more parameters at the UE or is in response to an expiry of a timer.

22. The method of claim 15, further comprising:
transmitting, to the UE, a request for a predetermined beam switching delay value, wherein receiving the plurality of UE capability values is based at least in part on transmitting the request for the predetermined beam switching delay value.

23. The method of claim 15, further comprising:
transmitting a first capability selection message indicating the first beam switching delay time of the plurality of different beam switching delay times; and
communicating with the UE in accordance with the first beam switching delay time based at least in part on transmitting the first capability selection message.

24. The method of claim 23, further comprising:
transmitting a second capability selection message indicating a second beam switching delay time of the plurality of different beam switching delay times, wherein the second beam switching delay time is different from the first beam switching delay time; and
communicating with the UE in accordance with the second beam switching delay time based at least in part on transmitting the second capability selection message.

25. A user equipment (UE) for wireless communication, comprising:
one or more memories storing processor-executable code; and
one or more processors coupled with the one or more memories and individually or collectively operable to execute the code to cause the UE to:
transmit, to a network entity and via one or more uplink messages, a plurality of UE capability values, each UE capability value of the plurality of UE capability values pertaining to UE support of a respective beam switching delay time of a plurality of different beam switching delay times for selection of a reception beam at the UE, the plurality of different beam switching delay times each associated with a same type of beam switching event;
receive, from the network entity, a first downlink message that triggers the beam switching event; and
switch to the reception beam in accordance with a first beam switching delay time of the plurality of different beam switching delay times based at least in part on receiving the first downlink message.

26. The UE of claim 25, wherein the beam switching event comprises receiving, at a time that is the first beam switching delay time after receiving the first downlink message, a second downlink message using the selected reception beam at the UE.

27. The UE of claim 26, wherein the first downlink message comprises a downlink control information signal comprising a transmission configuration indicator information, and the second downlink message comprises a physical downlink shared channel.

28. The UE of claim 26, wherein the first downlink message comprises a downlink control information signal and the second downlink message comprises an aperiodic channel state information reference signal.

29. The UE of claim 26, wherein the one or more processors are individually or collectively operable to cause the UE to:
transmit, at a time that is the first beam switching delay time after receiving the first downlink message, an indication of the selected reception beam at the UE, wherein the first downlink message comprises at least one of a downlink reference signal, a synchronization signal block, a channel state information reference signal, or a combination thereof.

30. A network entity for wireless communication, comprising:
one or more memories storing processor-executable code; and
one or more processors coupled with the one or more memories and individually or collectively operable to execute the code to cause the network entity to:
receive, from a user equipment (UE) and via one or more uplink messages, a plurality of UE capability values, each UE capability value of the plurality of UE capability values pertaining to UE support of a respective beam switching delay time of a plurality of different beam switching delay times for selection of a reception beam at the UE, the plurality of different beam switching delay times each associated with a same type of beam switching event;
transmit, to the UE, a first downlink message that triggers the beam switching event; and
communicate with the UE in accordance with a first beam switching delay time of the plurality of different beam switching delay times based at least in part on transmitting the first downlink message.

* * * * *